(12) United States Patent
Dahn et al.

(10) Patent No.: US 10,784,530 B2
(45) Date of Patent: Sep. 22, 2020

(54) DIOXAZOLONES AND NITRILE SULFITES AS ELECTROLYTE ADDITIVES FOR LITHIUM-ION BATTERIES

(71) Applicant: Tesla Motors Canada ULC, North York (CA)

(72) Inventors: Jeffery Raymond Dahn, Halifax (CA); Toren Hynes, Oyster Pond (CA); David Scott Hall, Halifax (CA)

(73) Assignee: Tesla, Inc., Palo Alto, CA (US)

( * ) Notice: Subject to any disclaimer, the term of this patent is extended or adjusted under 35 U.S.C. 154(b) by 35 days.

(21) Appl. No.: 16/045,082

(22) Filed: Jul. 25, 2018

(65) Prior Publication Data

US 2019/0393546 A1 Dec. 26, 2019

Related U.S. Application Data

(60) Provisional application No. 62/687,594, filed on Jun. 20, 2018.

(51) Int. Cl.
*H01M 10/0525* (2010.01)
*H01M 10/0567* (2010.01)

(52) U.S. Cl.
CPC ... *H01M 10/0525* (2013.01); *H01M 10/0567* (2013.01); *H01M 2220/20* (2013.01); *H01M 2300/0025* (2013.01)

(58) Field of Classification Search
None
See application file for complete search history.

(56) References Cited

U.S. PATENT DOCUMENTS

| 3,544,583 | A | 12/1970 | Burk, Jr. et al. |
| 2015/0244030 | A1* | 8/2015 | Ye ..................... H01M 10/0569 429/332 |
| 2017/0025706 | A1 | 1/2017 | Dahn et al. |

FOREIGN PATENT DOCUMENTS

| CN | 101740823 A | 6/2010 |
| WO | WO 2018/149823 A1 | 8/2018 |

OTHER PUBLICATIONS

Roser et al., Highly effective solid electrolyte interphase-forming electrolyte additive enabling high voltage lithium-ion batteries, Aug. 2017, Chem Mater, 29, 7733-7739. (Year: 2017).*
PCT International Search Report and Written Opinion for corresponding PCT/CA2018/000162 dated Feb. 28, 2019.
Roser et al., "Highly Effective Solid Electrolyte Interphase-Forming Electrolyte Additive Enabling High Voltage Lithium-Ion Batteries", Chemistry of Materials, vol. 29 (2017), pp. 773-7739.
Park et al., "Design of novel additives and nonaqueous solvents for lithium-ion batteries through screening of cyclic organic molecules: an ab initio study of redox potentials", Phys. Chem. Chem. Phys., vol. 16 (2014) pp. 22391-22398.

* cited by examiner

*Primary Examiner* — Daniel S Gatewood
(74) *Attorney, Agent, or Firm* — Knobbe, Martens, Olson & Bear, LLP

(57) ABSTRACT

Improved battery systems have been developed for lithium-ion based batteries. The improved systems include a non-aqueous electrolyte including one or more lithium salts, one or more nonaqueous solvents, and an additive or additive mixture comprising one or more operative additives selected from a group of disclosed compounds, including 3-aryl substituted 1,4,2-dioxazol-5-ones and 3-phenyl-1,3,2,4-dioxathiazole 2-oxide.

37 Claims, 19 Drawing Sheets

$^1$H NMR spectrum of BS.

FIG. 4  $^1$H NMR SPECTRUM of MDO.

FIG 5.   $^{13}$C NMR spectrum of MDO.

FIG 6. FTIR spectrum of MDO.

FIG. 7  $^1$H NMR spectrum of PDO.

FIG. 8 $^{13}$C NMR spectrum of PDO.

FIG. 9    FTIR spectrum of PDO.

FIG. 10  $^1$H NMR spectrum of BS.

FIG. 11 $^{13}$C NMR spectrum of BS.

FIG. 12 FTIR spectrum of BS.

DIOXAZOLONES AND NITRILE SULFITES AS ELECTROLYTE ADDITIVES FOR LITHIUM-ION BATTERIES

RELATED APPLICATION DATA

This application claims the benefit of priority U.S. Provisional Application No. 62/687,594, filed Jun. 20, 2018, the entirety of which is incorporated herein by reference to the extent permitted by law.

TECHNICAL FIELD

The present disclosure relates to rechargeable battery systems, and more specifically to the chemistry of such systems, including operative electrolyte additives, for improving the properties of the rechargeable lithium-ion-battery systems.

BACKGROUND

Rechargeable batteries are an integral component of energy-storage systems for electric vehicles and for grid storage (for example, for backup power during a power outage, as part of a microgrid, etc.). Li-ion-based batteries are a common type of rechargeable battery.

Electrolyte additives have been shown to be operative and increase the lifetime and performance of Li-ion-based batteries. For example, in J. C. Burns et al., *Journal of the Electrochemical Society*, 160, A1451 (2013), five proprietary, undisclosed electrolyte additives were shown to increase cycle life compared to an electrolyte system with no or only one additive. Other studies have focused on performance gains from electrolyte systems containing three or four additives as described in U.S. 2017/0025706. However, researchers typically do not understand the interaction between different additives that allow them to work together synergistically with the electrolyte and specific positive and negative electrodes. Thus, the identity of certain systems is often based on trial and error and cannot be predicted beforehand.

Prior studies have not identified two-additive electrolyte systems that can be combined into a lithium-ion battery system to yield a robust system with sufficient properties for grid or automobile applications. As discussed in U.S. 2017/0025706, two-additive systems studied (for example, 2% VC+1% allyl methanesulfonate and 2% PES+1% TTSPi) typically performed worse than the three- and four-additive electrolyte systems. (See, e.g., U.S. 2017/0025706 at Tables 1 and 2.) U.S. 2017/0025706 discloses that a third compound, often tris(-trimethly-silyl)-phosphate (TTSP) or tris (-trimethyl-silyl)-phosphite (TTSPi), was necessary in concentrations of between 0.25-3 wt % to produce a robust lithium-ion-battery system. (See, e.g., U.S. 2017/0025706 at ¶72.) However, because additives can be expensive and difficult to include within Li-ion batteries on a manufacture scale, more simple, yet effective battery systems are needed, including those with fewer additives.

To further progress the adoption of electric vehicles and grid energy storage applications, it is desirable to develop lithium-ion cell chemistries that offer longer lifetimes at high temperatures and high cell voltages, without significantly increasing cost. The introduction of sacrificial electrolyte additives on the order of a few weight percent is a practical method to form protective solid-electrolyte interphase (SEI) layers that limit electrolyte decomposition during cell storage and operation. In recent years, significant efforts have yielded a large number of such additives that may be used to improve cell performance for various applications. Examples are vinylene carbonate (VC), fluoroethylene carbonate (FEC), prop-1-ene-1,3-sultone (PES), ethylene sulfate (1,3,2-dioxathiolane-2,2-dioxide, DTD), and lithium difluorophosphate (LFO).

The present application provides compositions for use as electrolyte additives in lithium-ion battery systems.

Definitions

"Cell" or "battery cell" generally refers to an electrochemical cell, which is a device capable of generating electrical energy from chemical reactions or facilitating chemical reactions through the introduction of electrical energy. An electrical battery can contain one or more cells.

"Rechargeable battery" generally refers a type of electrical battery which can be charged, discharged into a load, and recharged a number of times. In this disclosure, a number of examples are described based on Li-ion rechargeable batteries. Nevertheless, embodiments of the present invention are not limited to one type of rechargeable battery, and can be applied in conjunction with various rechargeable battery technologies.

SUMMARY

This disclosure covers novel battery systems with fewer operative, electrolyte additives that may be used in different energy storage applications, for example, in vehicle and grid-storage. More specifically, this disclosure includes additive electrolyte systems that enhance performance and lifetime of lithium-ion batteries, while reducing costs from other systems that rely on more or other additives. This disclosure also provides methods of preparing additives disclosed herein.

Certain embodiments described herein include a nonaqueous electrolyte for a lithium ion battery comprising at least one lithium salt, at least one nonaqueous solvent, and an additive component comprising at least one operative additive. The at least one operative additive is selected from (a) the group consisting of 3-aryl substituted 1,4,2-dioxazol-5-one compounds according to Formula (I):

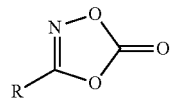

wherein R is any aromatic substituent, any unsaturated aliphatic substituent, or any aliphatic substituent containing one or more fluorine atoms; or (b) the group consisting of 3-CRR'R" substituted 1,4,2-dioxazol-5-one compounds according to Formula (II):

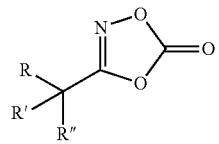

wherein each of R, R', and R" is hydrogen, alkyl substituents, or aromatic substituents; or (c) the group consisting of R-substituted nitrile sulfite compounds according to
Formula (III):

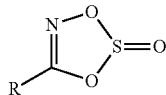

wherein R is any alkyl or aromatic substituent.

In certain further embodiments, the at least one operative additive is in a range from 0.01 to 6 wt. %, based on the total weight of the electrolyte solution. In other embodiments, the at least one operative additive is in a range from 0.25 to 5 wt. %, based on the total weight of the electrolyte solution. In other embodiments, the concentration of the at least one operative additive is about 2% by weight.

In other embodiments, wherein the additive component includes ethylene sulfate, lithium difluorophosphate, vinylene carbonate, and/or fluoroethylene carbonate. In further embodiments the additive component includes 3-phenyl-1,4,2-dioxazol-5-one.

In certain embodiments, the at least one nonaqueous is a carbonate solvent. In further embodiments, the carbonate solvent is ethylene carbonate or dimethyl carbonate. In yet further embodiments, the nonaqueous solvent includes at least 2 nonaqueous solvents.

In other embodiments, provided is a lithium-ion battery including a negative electrode; a positive electrode; and a nonaqueous electrolyte comprising a lithium salt dissolved in at least one nonaqueous solvent, and an additive component comprising at least one operative additive from (a) the group consisting of 3-aryl substituted 1,4,2-dioxazol-5-one compounds according to Formula (I):

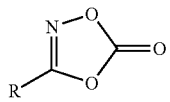

wherein R is any aromatic substituent, any unsaturated aliphatic substituent, or any aliphatic substituent containing one or more fluorine atoms or (b) the group consisting of 3-CRR'R" substituted 1,4,2-dioxazol-5-one compounds according to Formula (II):

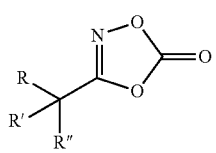

wherein each of R, R', and R" is hydrogen, alkyl substituents, or aromatic substituents; or (c) the group consisting of R-substituted nitrile sulfite compounds according to Formula (III):

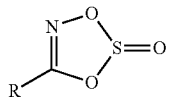

wherein R is any alkyl or aromatic substituent.

In certain further embodiments, the at least one operative additive is in a range from 0.01 to 6 wt. %, based on the total weight of the electrolyte solution. In other embodiments, the at least one operative additive is in a range from 0.25 to 5 wt. %, based on the total weight of the electrolyte solution. In other embodiments, the concentration of the at least one operative additive is about 2% by weight.

In other embodiments, wherein the additive component includes ethylene sulfate, lithium difluorophosphate, vinylene carbonate, and/or fluoroethylene carbonate. In further embodiments the additive component includes 3-phenyl-1,4,2-dioxazol-5-one.

In certain embodiments, the at least one nonaqueous is a carbonate solvent. In further embodiments, the carbonate solvent is ethylene carbonate or dimethyl carbonate. In yet further embodiments, the nonaqueous solvent includes at least 2 nonaqueous solvents.

In other embodiments, the lithium-ion battery has 95% retention of initial capacity after 200 cycles between 3.0 V and 4.3 V at a charging rate of C/3 CCCV at 40° C. In further embodiments, the lithium-ion battery has 95% retention of initial capacity after 400 cycles between 3.0 V and 4.3 V at a charging rate of C/3 CCCV at 40° C.

In another aspect, provided is an electric vehicle with a rechargeable battery including a drive motor, a gear box, electronics, and a battery system. The battery system includes a negative electrode; a positive electrode; and a nonaqueous electrolyte comprising a lithium salt dissolved in at least one nonaqueous solvent, and an additive component comprising at least one operative additive from (a) the group consisting of 3-aryl substituted 1,4,2-dioxazol-5-one compounds according to Formula (I):

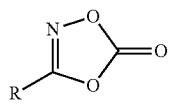

wherein R is any aromatic substituent, any unsaturated aliphatic substituent, or any aliphatic substituent containing one or more fluorine atoms; or (b) the group consisting of 3-CRR'R" substituted 1,4,2-dioxazol-5-one compounds according to Formula (II):

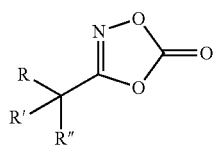

wherein each of R, R', and R" is hydrogen, alkyl substituents, or aromatic substituents; or (c) the group consisting of R-substituted nitrile sulfite compounds according to
Formula (III):

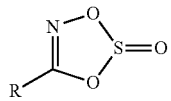

wherein R is any alkyl or aromatic substituent.

In certain further embodiments, the at least one operative additive is in a range from 0.01 to 6 wt. %, based on the total weight of the electrolyte solution. In other embodiments, the at least one operative additive is in a range from 0.25 to 5 wt. %, based on the total weight of the electrolyte solution. In other embodiments, the concentration of the at least one operative additive is about 2% by weight.

In other embodiments, wherein the additive component includes ethylene sulfate, lithium difluorophosphate, and/or vinylene carbonate. In further embodiments the additive component includes 3-phenyl-1,4,2-di oxazol-5-one.

In certain embodiments, the at least one nonaqueous is a carbonate solvent. In further embodiments, the carbonate solvent is ethylene carbonate or dimethyl carbonate. In yet further embodiments, the nonaqueous solvent includes at least 2 nonaqueous solvents.

In other embodiments, the battery system has 95% retention of initial capacity after 200 cycles between 3.0 V and 4.3 V at a charging rate of C/3 CCCV at 40° C. In further embodiments, the battery system has 95% retention of initial capacity after 400 cycles between 3.0 V and 4.3 V at a charging rate of C/3 CCCV at 40° C.

DETAILED DESCRIPTION OF THE DISCLOSURE

Figure 1:
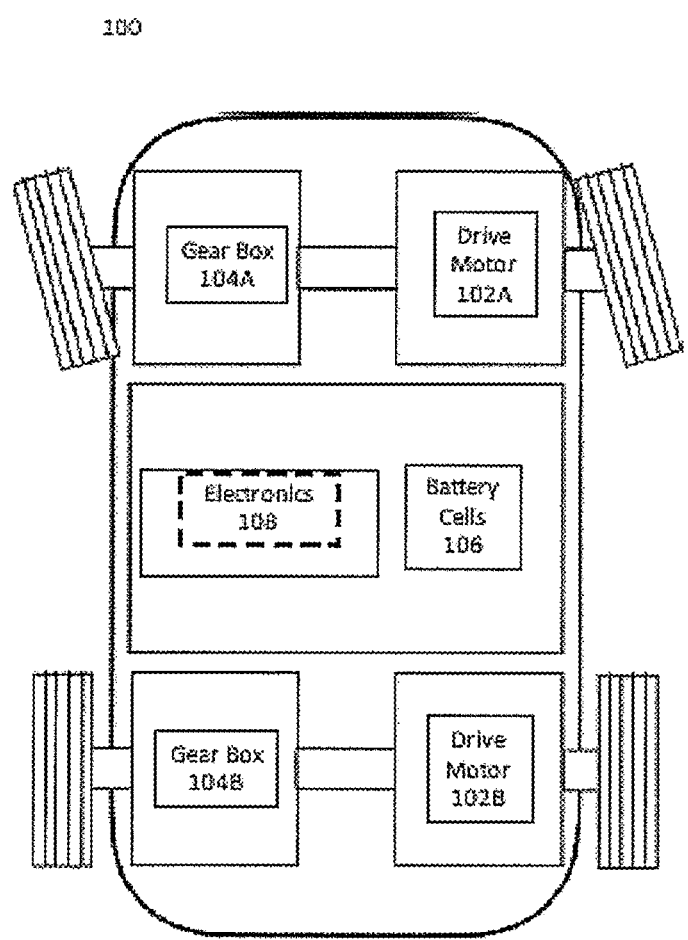
FIG. 1 is a schematic diagram of a vehicle containing a battery storage system.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, battery cells 106 and electronics 108. Generally, the battery cells 106 provide electricity to power electronics of the electric vehicle 100 and to propel the electric vehicle 100 using the drive motor 102A and/or 102B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles. Certain parts created using embodiments of the present disclosure may be used in vehicle 100.

Figure 2:
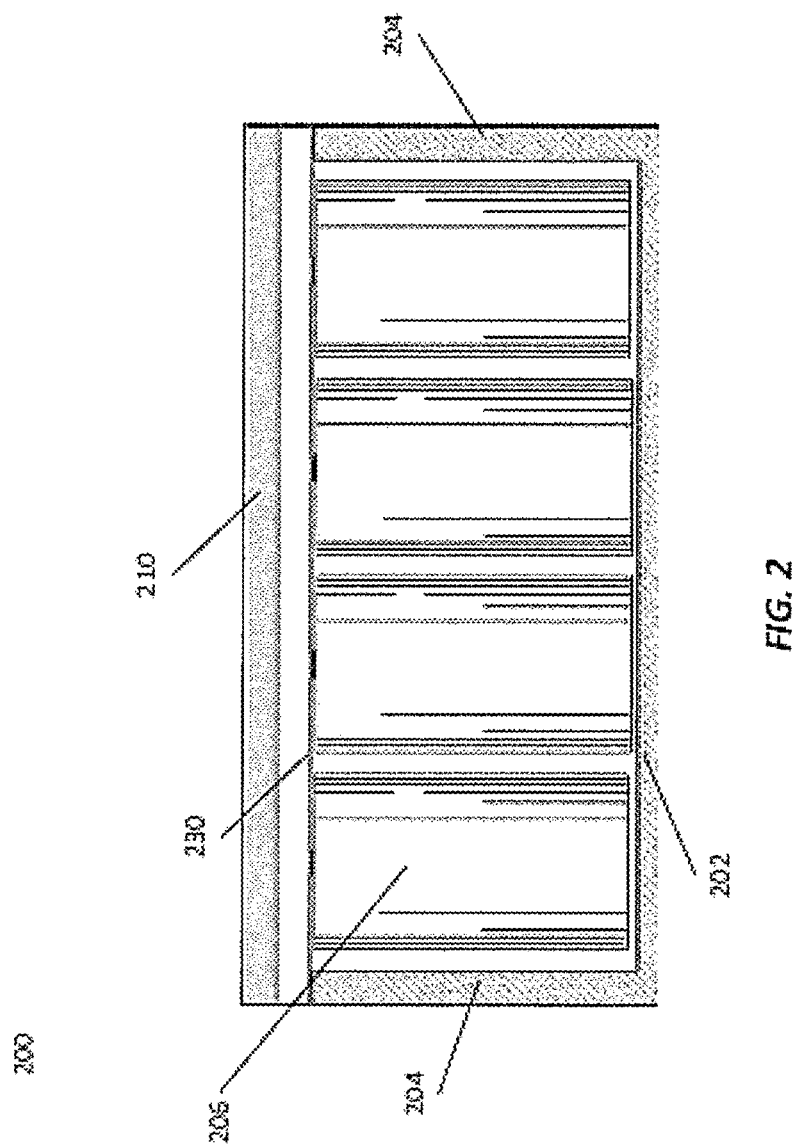
FIG. 2 is a schematic diagram of an exemplary battery storage system.

FIG. 2 illustrates a schematic view of an exemplary energy storage system 200 showing various components. The energy storage system 200 typically includes a modular housing with at least a base 202 and four side walls 204 (only two shown in the figure). The module housing is generally electrically isolated from the housed battery cells 206. This may occur through physical separation, through an electrically insulating layer, through the choice of an insulating material as the module housing, any combination thereof, or another through another method. The base 202 may be an electrically insulating layer on top of a metal sheet or a nonconductive/electrically insulating material, such as polypropylene, polyurethane, polyvinyl chloride, another plastic, a nonconductive composite, or an insulated carbon fiber. Side walls 204 may also contain an insulating layer or be formed out of a nonconductive or electrically insulating material, such as polypropylene, polyurethane, polyvinyl chloride, another plastic, a nonconductive composite, or an insulated carbon fiber. One or more interconnect layers 230 may be positioned above the battery cells 206, with a top plate 210 positioned over the interconnect layer 230. The top plate 210 may either be a single plate or be formed from multiple plates.

Figure 3:
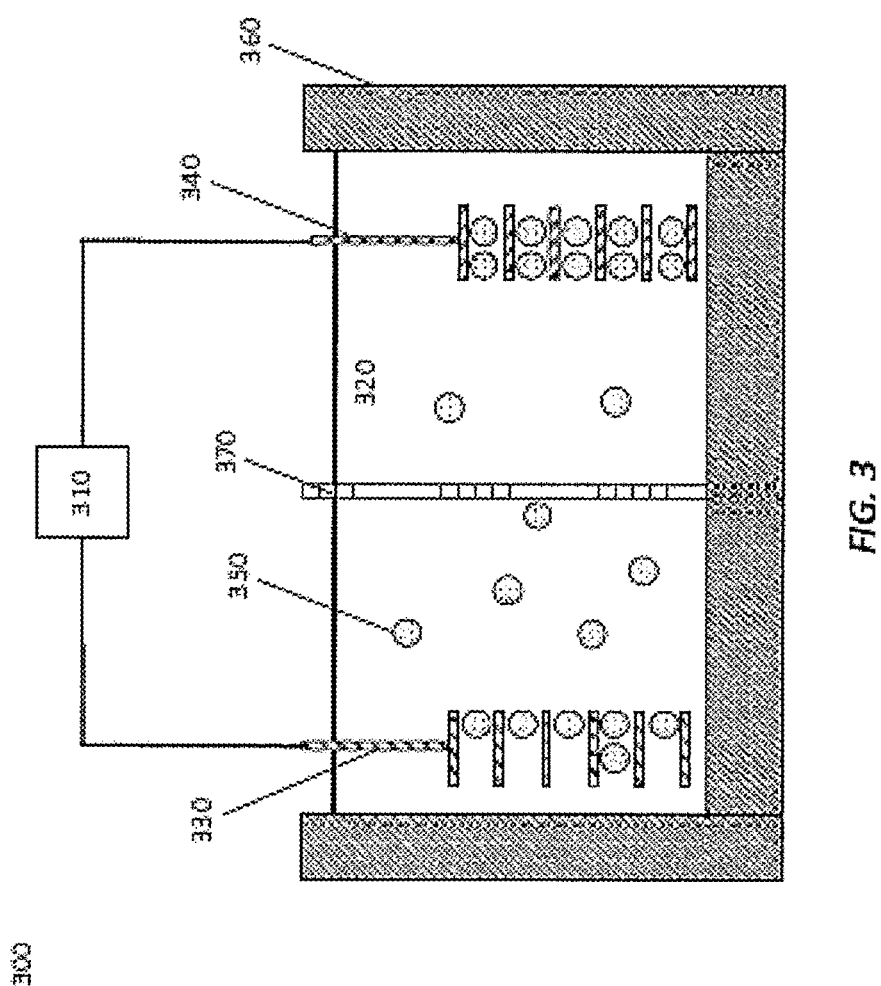
FIG. 3 is a schematic diagram of a lithium-ion, battery-cell system.

Individual battery cells 106 and 206 often are lithium-ion battery cells, with an electrolyte containing lithium ions and positive and negative electrodes. FIG. 3 illustrates a schematic of a lithium ion cell 300. Lithium ions 350 are dispersed throughout electrolyte 320, within container 360.

Container 360 may be part of a battery cell. The lithium ions 350 migrate between positive electrode 330 and negative electrode 340. Separator 370 separates the negative electrode and positive electrode. Circuitry 310 connects the negative electrode and positive electrode.

The present disclosures provides novel electrolyte and battery systems for use in grid and electric vehicle applications, such as the ones described above, as well as newly identified compounds and compositions for use in such systems. Certain embodiments described herein include a nonaqueous electrolyte for a lithium ion battery comprising at least one lithium salt, at least one nonaqueous solvent, and an additive component comprising at least one operative additive. The at least one operative additive is selected from (a) the group consisting of 3-aryl substituted 1,4,2-dioxazol-5-one compounds according to Formula (I):

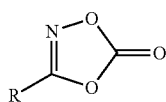

wherein R is any aromatic substituent, any unsaturated aliphatic substituent, or any aliphatic substituent containing one or more fluorine atomsor (b) the group consisting of 3-CRR'R" substituted 1,4,2-dioxazol-5-one compounds according to Formula (II):

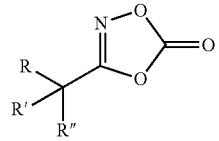

wherein each of R, R', and R" is hydrogen, alkyl substituents, or aromatic substituents; or (c) the group consisting of R-substituted nitrile sulfite compounds according to Formula (III):

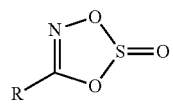

wherein R is any alkyl or aromatic substituent.

Exemplary 3-aryl substituted 1,4,2-dioxazol-5-one compounds according to certain embodiments include those shown in Table 1.

TABLE 1

Summary of 3-aryl-substituted 1,4,2-dioxazol-5-one compounds.

| Abbrev. | Name(s) | CAS No. | Structure |
|---------|---------|---------|-----------|
| PDO | 3-phenyl-1,4,2-dioxazol-5-one | 19226-36-9 | |
| o-FDO | 3-orthofluorophenyl-1,4,2-dioxazol-5-one<br>3-(2-fluorophenyl)-1,4,2-dioxazol-5-one | 1899109-38-6 | |
| m-FDO | 3-metafluorophenyl-1,4,2-dioxazol-5-one<br>3-(3-fluorophenyl)-1,4,2-dioxazol-5-one | 54547-79-4 | |
| p-FDO | 3-parafluorophenyl-1,4,2-dioxazol-5-one<br>3-(4-fluorophenyl)-1,4,2-dioxazol-5-one | 1809437-68-0 | |
| p-MODO | 3-paramethoxyphenyl-1,4,2-dioxazol-5-one<br>3-(4-methoxyphenyl)-1,4,2-dioxazol-5-one | 19226-37-0 | |

TABLE 1-continued

Summary of 3-aryl-substituted 1,4,2-dioxazol-5-one compounds.

| Abbrev. | Name(s) | CAS No. | Structure |
|---|---|---|---|
| TDO | 3-(2-thienyl)-1,4,2-dioxazol-5-one | 1373758-55-4 | |
| pen-FDO+ | 3-pentafluorophenyl-1,4,2-dioxazol-5-one<br>3-(2,3,4,5,6-pentafluorophenyl)-1,4,2-dioxazol-5-one | 1691206-43-5 | |
| p-TFMDO+ | 3-paratrifluoromethylphenyl-1,4,2-dioxazol-5-one<br>3-[4-(trifluoromethyl)phenyl]-1,4,2-dioxazol-5-one | 1899109-29-5 | |
| p-NDO+ | 3-paranitrophenyl-1,4,2-dioxazol-5-one<br>3-(4-nitrophenyl)-1,4,2-dioxazol-5-one | 19226-38-1 | |

MDO

Formula IV

BS

Formula VI

Chemical structures of other exemplary additives for the electrolyte solutions discussed herein include the formulas shown above: 3-methyl-1,4,2-dioxazol-5-one (MDO) (Formula IV) and benzonitrile sulfite, 3-phenyl-1,3,2,4-dioxathiazole 2-oxide (BS) (Formula VI).

MDO, or 3-methyl-1,4,2-dioxazol-5-one, has demonstrated ability to passivate graphite anodes against exfoliation in the presence of propylene carbonate (PC). See, e.g., Chem. Mater., 2017, 29 (18), pp 7733-7739.

In other further embodiments, the additives to the electrolyte solutions described herein are in a range from 0.01 to 6 wt. %, based on the total weight of the electrolyte solution. In other embodiments, the at least one operative additive is in a range from 0.25 to 5 wt. %, 0.35 to 4.5 wt. %, 0.45 to 4 wt. %, 0.55 to 3.5 wt. %, 0.65 to 3 wt. %, 0.75 to 2.5 wt. %, 0.85 to 2 wt. %, 0.95 to 2 wt. %, 1.05 to 1.5 wt. %, 1 to 5 wt. %, 1 to 4 wt. %, 1 to 3 wt. %, 2 to 4 wt. %, 1 to 2 wt. %, 3 to 4 wt. %, 2 to 5 wt. %, or 2 to 4 wt. % based on the total weight of the electrolyte solution. In other embodiments, the concentration of the at least one operative additive is about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.2%, 1.3%, 1.4%, 1.5%, 1.6%, 1.7%, 1.8%, 1.9%, 2.0%, 2.5%, 3%, 3.5%, 4% 4.5%, 5%, 5.5%, or 6% by weight.

The additive component may include a combination of additives of described herein. Additionally, the additive component may include ethylene sulfate, lithium difluorophosphate, vinylene carbonate, fluoroethylene carbonate and combinations thereof.

In certain embodiments, the at least one nonaqueous is a carbonate solvent. In further embodiments, the carbonate solvent is ethylene carbonate or dimethyl carbonate. In yet further embodiments, the nonaqueous solvent includes at least 2 nonaqueous solvents.

In other embodiments, the battery systems described herein have a 95% retention of initial capacity after 200 cycles between 3.0 V and 4.3 V at a charging rate of C/3 CCCV at 40° C. In further embodiments, the battery system has 95% retention of initial capacity after 300 cycles between 3.0 V and 4.3 V at a charging rate of C/3 CCCV at 40° C. In further embodiments, the battery system has 95% retention of initial capacity after 400 cycles between 3.0 V and 4.3 V at a charging rate of C/3 CCCV at 40° C.

The cell formation, long-term cycling performance, and high temperature storage behavior of MDO (Formula IV), 3-phenyl-1,4,2-dioxazol-5-one (PDO, Formula V) and BS (benzonitrile sulfite; alternatively 3-phenyl-1,3,2,4-dioxathiazole 2-oxide, Formula VI), and binary blends thereof, in $LiNi_{1-x-y}Mn_xCo_yO_2$ (NMC)/graphite pouch cells was studied. The results reported by others strongly suggest that MDO primarily acts by passivating the graphite electrode. It is, however, unknown whether these additives affect the positive electrode. Therefore, the studies described herein also tested each additive in binary additive mixtures with VC, DTD, and LFO, which are known to sometimes have beneficial effects at the positive electrode.

Differential capacity results indicate that MDO and PDO form passive solid-electrolyte interphase layers on the graphite electrode during cell formation, whereas BS does not. It is demonstrated that PDO is a highly promising new additive, especially when used as a binary blend with lithium difluorophosphate or ethylene sulfate.

Pre-Experimental Setup

Although the battery systems themselves may be packaged differently according to the present disclosure, the experimental setup typically used machine made "sealed cells" to systematically evaluate the battery systems using a common setup, including the two-additive electrolyte systems and materials for use as the positive and negative electrodes. All percentages mentioned within this disclosure are weight percentages unless otherwise specified. A person of skill in the art will appreciate that the type of additive to be used and the concentration to be employed will depend on the characteristics which are most desirably improved and the other components and design used in the lithium ion batteries to be made and will be apparent from this disclosure.

Additive Synthesis

MDO, PDO, and BS were synthesized using the routes shown below.

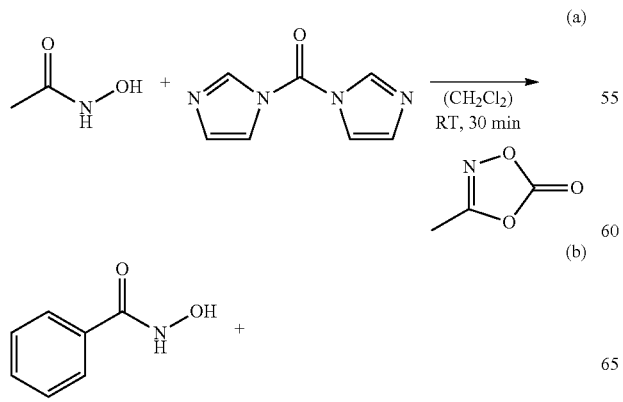

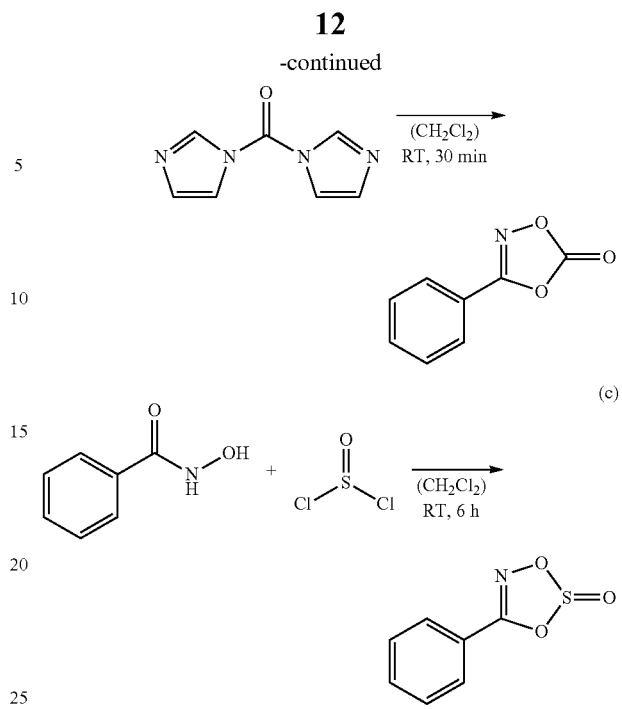

Reaction a) shows synthesis of 3-methyl-1,4,2-dioxazol-5-one (MDO), reaction b) shows synthesis of 3-phenyl-1,4,2-dioxazol-5-one (PDO), and reaction c) shows synthesis of benzonitrile sulfite (BS).

All solvents and starting materials were used as-received, without further purification. Thionyl chloride (1 M in $CH_2Cl_2$) and benzohydroxamic acid (98%) were purchased from Alfa Aesar. 1,1'-carbonyldiimidazole (CDI, ≥98%) and acetohydroxamic acid (95%) were purchased from Oakwood Chemical Inc. Following preparation, additives were characterized by nuclear magnetic resonance spectroscopy (NMR) and Fourier transform infrared spectroscopy (FTIR). Full details of the syntheses and the characterization results are provided below.

MDO and PDO were synthesized as follows. To a stirred solution of hydroxamic acid (5.00 g, 36.5 mmol, 1 eq) in dichloromethane (120 mL), 1,1'-carbonyldiimidazole (5.92 g, 36.5 mmol, 1 eq) was added in one portion. The mixture was stirred for half an hour at room temperature, quenched with 50 mL of 1N $H_2SO_4$, extracted with dichloromethane (3×40 mL), and dried over $Na_2SO_4$. Volatiles were removed under reduced pressure to give 3-substituted 1,4,2-dioxazol-5-ones. The product (3-methyl-1,4,2-dioxazol-5-one) was recrystallized from diethyl ether using liquid nitrogen, or from a 10:1 mixture of cyclohexane:acetone (3-phenyl-1,4,2-dioxazol-5-one). The structure of 3-methyl-1,4,2-dioxazol-5-one (MDO) is shown below:

Formula (IV)

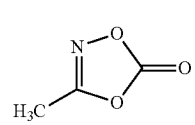

The structure of 3-phenyl-1,4,2-dioxazol-5-one (PDO) is shown below:

Formula (V)

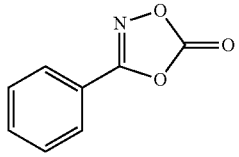

Additional 3-substituted-1,4,2-dioxazol-5-ones were also synthesized, including o-FDO, m-FDO, p-FDO, p-MODO, and TDO. These compounds were prepared by dissolving potassium carbonate ($K_2CO_3$, 3.32 g, 24.0 mmol, 2 eq) and hydroxylamine hydrochloride ($HN_2OH*HCl$, 1.67 g, 24.0 mmol, 2 eq) in 40 mL water ($H_2O$), to which 60 mL of ethyl acetate was added. 12.0 mmol of the corresponding acyl chloride (c-FDO: 2-fluorobenzoyl chloride; m-FDO: 3-fluorobenzoyl chloride; p-FDO, 4fluorobenzoyl chloride; p-MODO: 4-methoxybenzoyl chloride; TDO: 2-thiophenecarbonyl chloride) was dissolved in 20 mL ethyl acetate, and this was added dropwise at 0° C. with constant stirring by magnetic bar. The reaction was allowed to warm up to room temperature and left to proceed for 16 hr with constant stirring. The aqueous layer was extracted with ethyl acetate (3×30 mL), dried over anhydrous sodium sulfate ($Na_2SO_4$), and the solvent removed under reduced pressure. The residue from the previous step was added to 40 mL dichloromethane, and 1,1'-carbonyldiimidazole (1.95 g, 12.0 mmol, 1 eq) was added in one portion. The reaction was allowed to proceed for 30 min with constant stirring by magnetic stir bar. The reaction was then quenched with 1M $H_2SO_4$ (25 mL), extracted with dichloromethane (3×25 mL), and then dried over anhydrous sodium sulfate. Solvent was removed under reduced pressure to obtain the product.

Benzonitrile sulfite (BS, 5-phenyl-1,3,2,4-dioxathiazole 2-oxide) was prepared as follows. To a solution of thionyl chloride (30 mL, 1M, 30 mmol, 3 eq), benzohydroxamic acid (1.4 g, 10.0 mmol, 1 eq) was added. The mixture was stirred for 6 hr at room temperature. Excess thionyl chloride and solvent were removed under reduced pressure to yield 5-phenyl-1,3,2,4-dioxathiazole 2-oxide (1.57 g, 80%). The product was rescrystallised from diethyl ether using liquid nitrogen for purification. The structure of 5-phenyl-1,3,2,4-dioxathiazole 2-oxide is shown below:

Formula (VI)

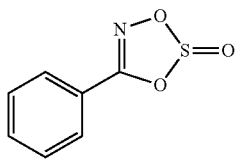 [SMILES: O=c1onc(-c2ccccc2)o1]

Additive Characterization

Figure 4:
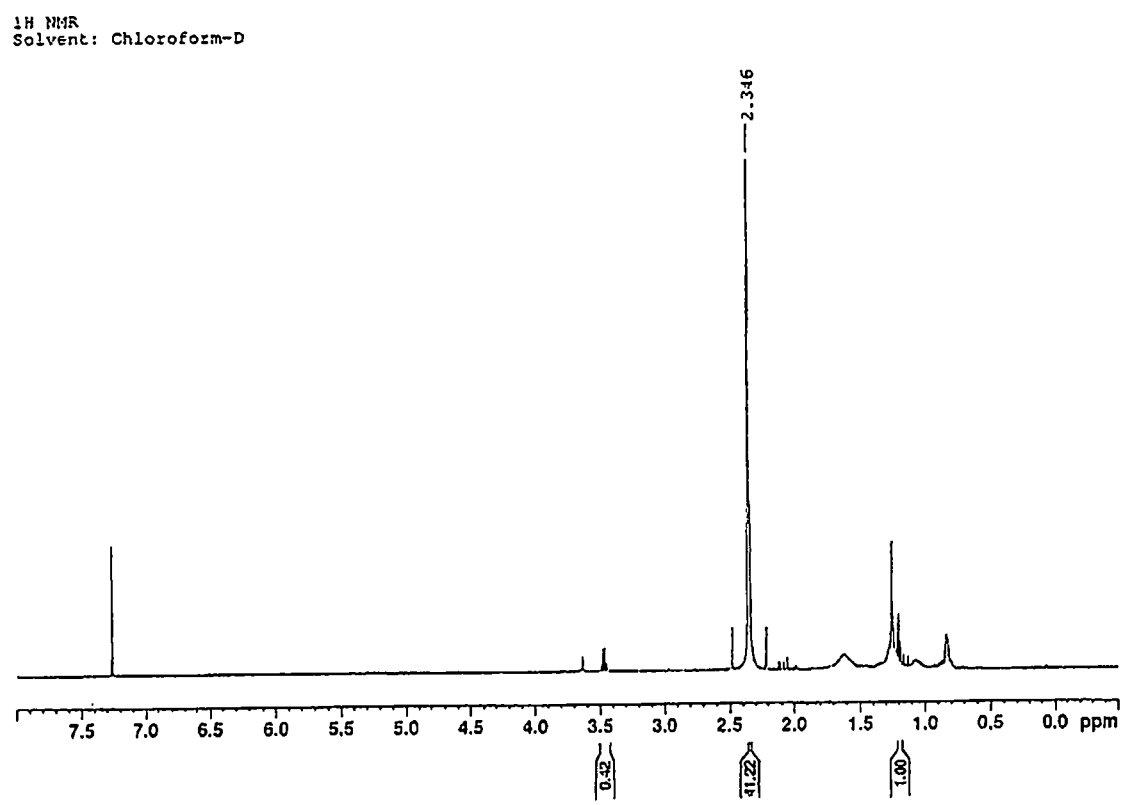
FIG. 4 is a $^1$H NMR spectrum of 3-methyl-1,4,2-dioxazol-5-one (MDO), synthesized as described herein.
Figure 5:
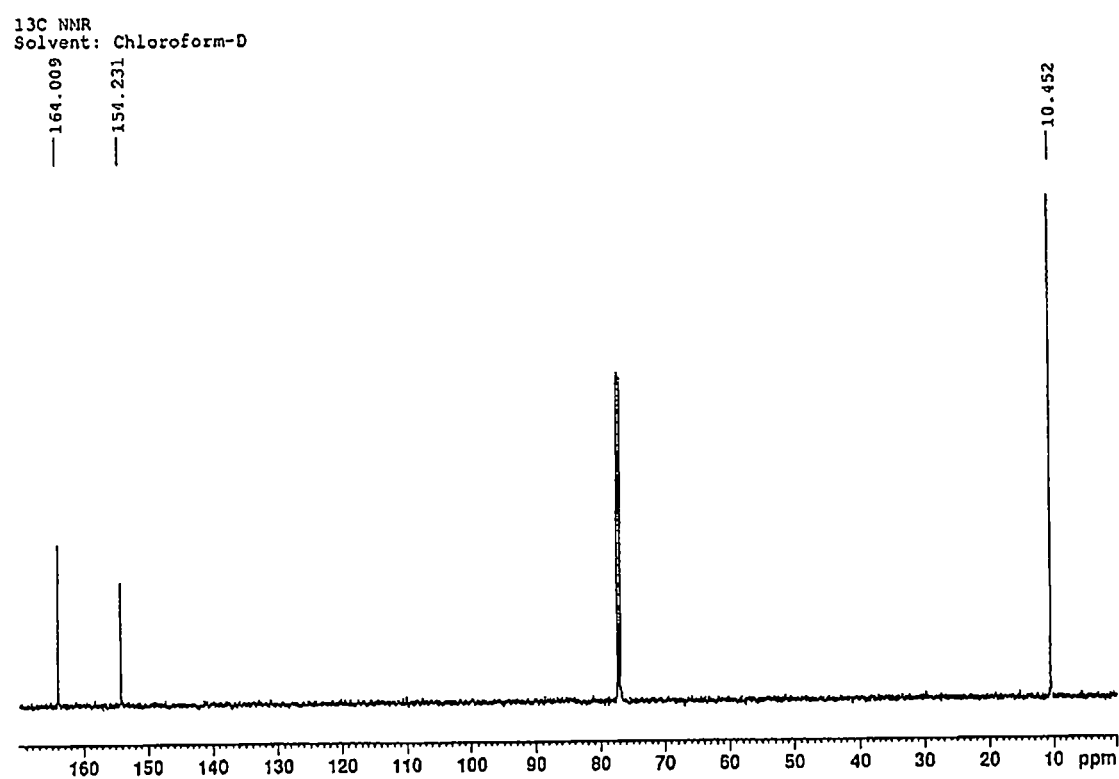
FIG. 5 is a $^{13}$C NMR spectrum of MDO, synthesized as described herein.
Figure 7:
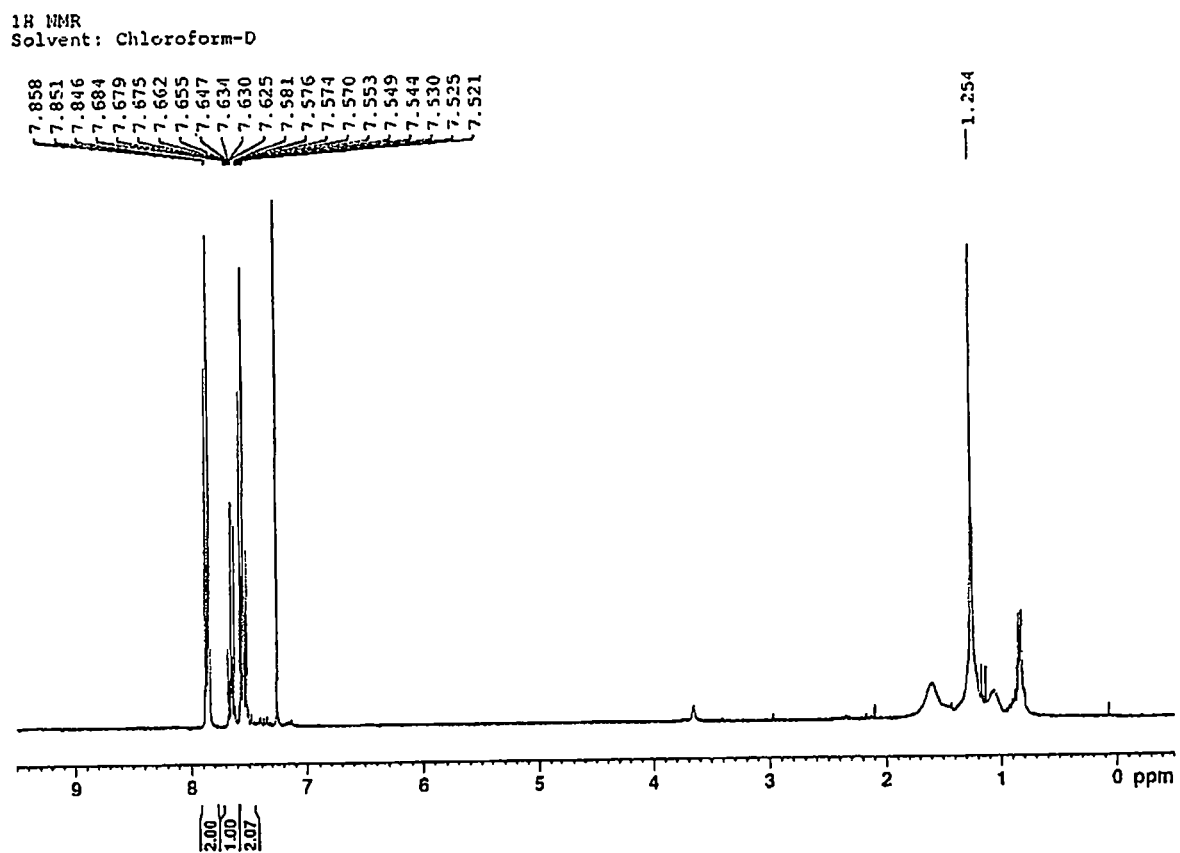
FIG. 7 is a $^1$H NMR spectrum of 3-phenyl-1,4,2-dioxazol-5-one (PDO), synthesized as described herein.
Figure 8:
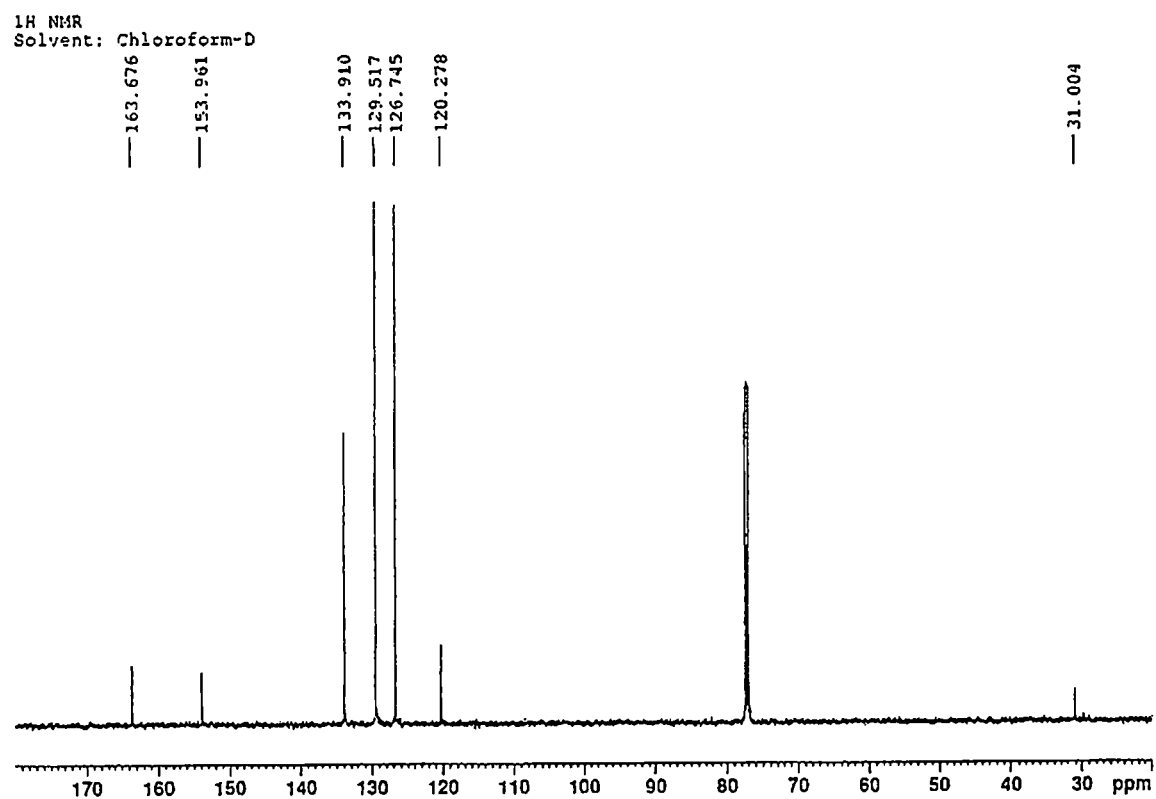
FIG. 8 is a $^{13}$C NMR spectrum of PDO, synthesized as described herein.
Figure 10:
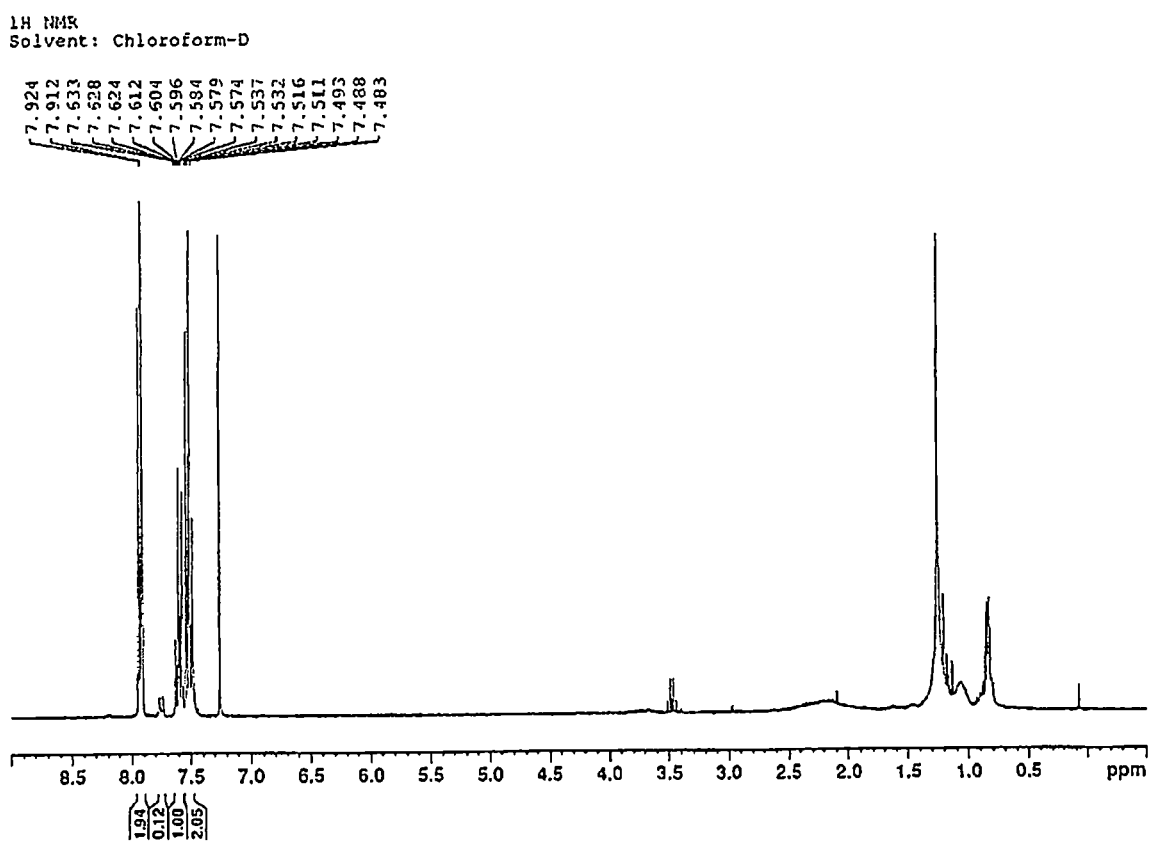
FIG. 10 is a $^1$H NMR spectrum of benzonitrile sulfite (BS), synthesized as described herein.
Figure 11:
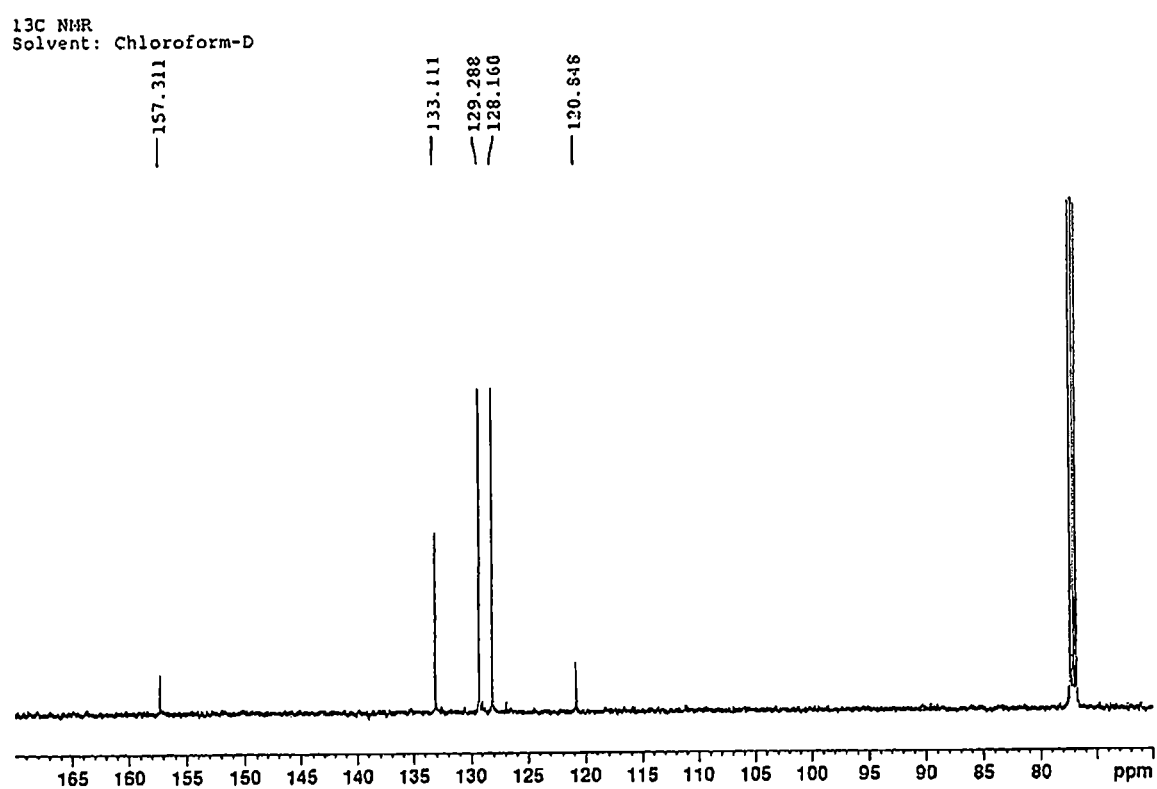
FIG. 11 is a $^{13}$C NMR spectrum of BS, synthesized as described herein.

Following isolation, and purification, the MDO, PDO, and BS additives synthesized as described above were characterized by nuclear magnetic resonance spectroscopy (NMR) using a Bruker AV500 spectrometer controlled by ICON-NMR software. MDO was characterized using $^1$H NMR ($CDCl_3$, 500 MHz): 2.35 (s, 3H), as shown in FIG. 4. MDO was characterized using $^{13}$C NMR ($CDCl_3$, 125 MHz): 164.0, 154.2, 10.5, as shown in FIG. 5. PDO was characterized using $^1$H NMR ($CDCl_3$, 300 MHz): 7.83-7.89 (m, 2H), 7.61-7.69 (m, 1H), 7.50-7.59 (m, 2H), as shown in FIG. 7. PDO was characterized using $^{13}$C NMR ($CDCl_3$, 125 MHz): 163.7, 154.0, 133.9, 129.6, 126.7, 120.3, as shown in FIG. 8. BS was characterized using $^1$H NMR ($CDCl_3$, 500 MHz): 7.90-7.96 (m, 2H), 7.56-7.64 (m, 1H), 7.47-7.55 (m, 2H), as shown in FIG. 10. BS was characterized using $^{13}$C NMR ($CDCl_3$, 125 MHz): 157.3, 133.1, 129.3, 128.2, 120.8, as shown in FIG. 11. Chemical shifts are reported in ppm relative to the residual solvent peak.

Figure 6:
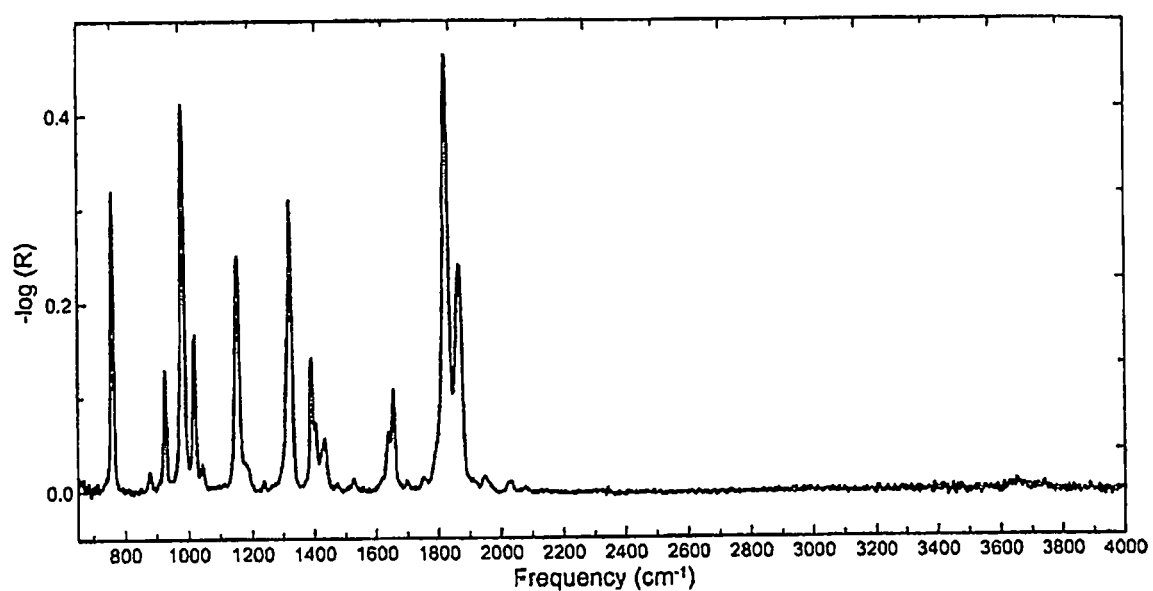
FIG. 6 is a FTIR spectrum of MDO, synthesized as described herein.
Figure 9:
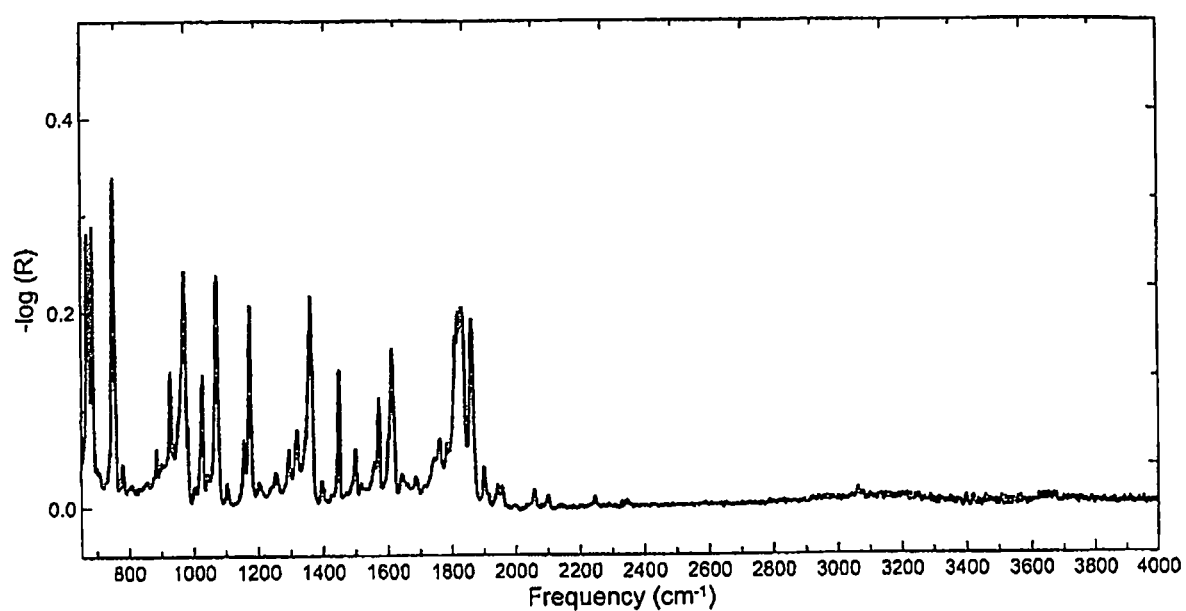
FIG. 9 is a FTIR spectrum of PDO, synthesized as described herein.
Figure 12:
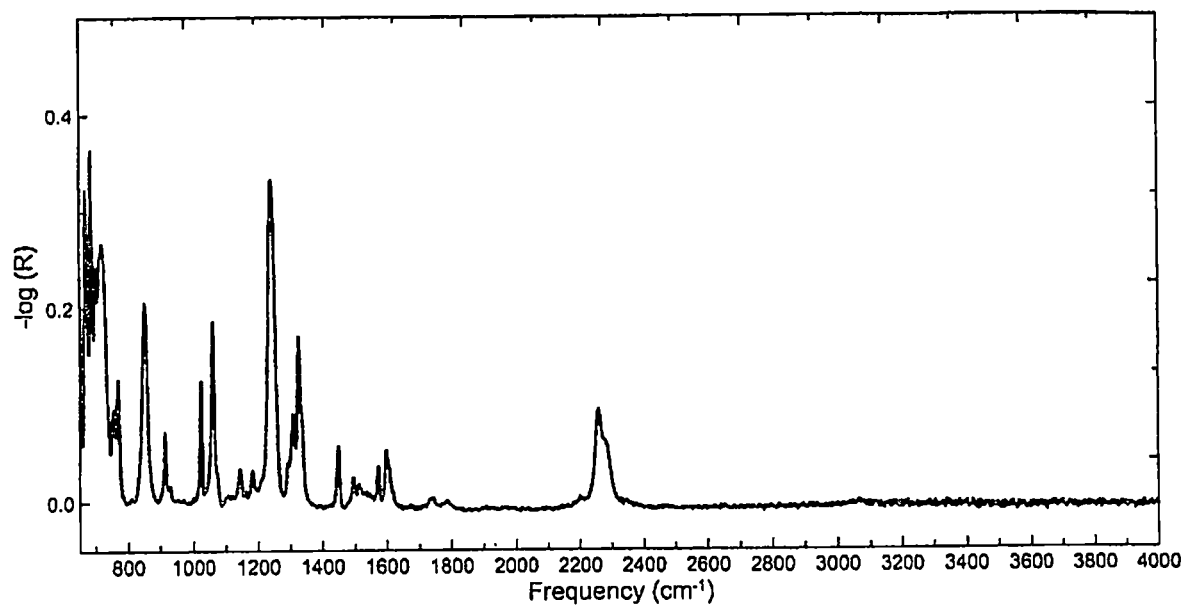
FIG. 12 is a FTIR spectrum of BS, synthesized as described herein.

Materials were also characterized by Fourier transform infrared spectroscopy (FTIR) using a Cary 630 FTIR (Agilent Technologies) equipped with a germanium crystal attenuated total reflectance (ATR) accessory, controlled by MicoLab PC software, and measured at 4 cm$^{-1}$ resolution. The FTIR spectrum of 3-methyl-1,4,2-dioxazol-5-one (MDO) is shown in FIG. 6; the spectrum of 3-phenyl-1,4,2-dioxazol-5-one (PDO) is shown in FIG. 9, and the spectrum of BS is shown in FIG. 12.

Lithium-Ion Cells

Dry (no electrolyte), vacuum-sealed $LiNi_{0.5}Mn_{0.3}Co_{0.2}O_2$ (NMC532)/graphite and $LiNi_{0.6}Mn_{0.2}Co_{0.2}O_2$ (NMC622)/graphite pouch cells, with capacity of ~220 mAh and ~230 mAh, respectively, were received from LiFun Technology (Tianyuan District, Zhuzhou, Hunan, China). The cells were cut below the heat seal in an argon-atmosphere glove box, dried under vacuum at 80° C. for 14 h, and then returned to the glove box for filling. All solutions used 1.2 mol L$^{-1}$ $LiPF_6$ (BASF, ≥99.9%) in a 3:7 solvent blend, by mass, of ethylene carbonate (EC) and dimethyl carbonate (DMC), as received from BASF (<20 ppm $H_2O$). The additives MDO (synthesized as described above), PDO (synthesized as described above), BS (synthesized as described above), VC (BASF, ≥99.8%), DTD (Guangzhou Tinci Materials Tech. Co. Ltd., ≥98%), and $LiPO_2F_2$ (abbreviated as "LFO", Shenzhen CapChem Tech. Co. Ltd.) were added singly or as binary blends to this electrolyte solution in the indicated mass percentages. Cells were filled with 1.0±0.1 g of solution, sealed at −90 kPa gauge pressure using a compact vacuum sealer (MSK-115A, MTI Corp.) and immediately held at 1.5 V at room temperature (21-25° C.) to prevent corrosion of the copper current collector during the ~24 h wetting period that followed. Cells were then loaded into temperature-controlled boxes (40.0±0.1° C.) and connected to a Maccor 4000 Series automated test system (Maccor Inc.). Because gas formation was expected to occur during formation, the pouch cells were clamped using soft rubber (at about 25 kPa gauge pressure), which had previously been observed to significantly improve the experimental precision.

Electrochemical Testing

SEI formation was performed by charging cells at C/20 to 4.3 V, holding at 4.3 V for 1 h, discharging at C/20 to 3.8 V, and then holding cells at 3.8 V for 1 h. Cells were weighed under water before and after formation, allowing the change in displacement volume to be determined using the Archimedes principle. Cells were then degassed by cutting the pouch open in an argon-atmosphere glove box, and resealed using the compact vacuum sealer. Cells were weighed again and electrochemical impedance spectroscopy (EIS) was then measured at 10.0±0.1° C. using a BioLogic VMP3 instrument (100 kHz-10 mHz, ±10 mV sinusoidal amplitude). Following formation, cells were either taken for storage or long-term cycling.

For storage, cells were maintained at 40.±0.1° C. while they were cycled between 2.8-4.3 V twice and then held at 4.3 V for 24 h. Cells were then increased in temperature to 60.±0.1° C. and the cell voltage was recorded at open circuit for 500 hr. Following storage, cells were charge-discharge cycled twice again and then charged to 3.8 V. EIS was then measured and cells were weighed under water again to determine gas evolution during storage.

For long-term cycling, cells were maintained at 40.±0.1° C. and cycled by charging at C/3 to 4.3 V, and holding the voltage at 4.3 V until the charge current decreased below C/20. Cells were then discharged at C/3 to 2.8 V before being charged again. A slow charge-discharge cycle at C/20 was performed every 50 cycles.

Density Functional Theory Calculations

Density functional theory (DFT) calculations were performed using Gaussian (G09.d01), as described in M. J. Frisch, G. W. Trucks, H. B. Schlegel, G. E. Scuseria, M. A. Robb, J. R. Cheeseman, et al., Gaussian 09, Gaussian, Inc., Wallingford, Conn., USA, (2009). Geometry optimization and normal mode analyses were performed using the M062X hybrid functional, as described in Y. Zhao and D. G. Truhlar, Theor. Chem. Acc., 120, 215-241 (2007); the IEF-PCM-UFF implicit solvation model (ε=20), as described in D. S. Hall, J. Self, and J. R. Dahn, J. Phys. Chem. C, 119, 22322-22330 (2015), J. Tomasi, B. Mennucci, and R. Cammi, Chem. Rev., 105, 2999-3094 (2005), and J. Tomasi, B. Mennucci, and E. Cancès, J. Mol. Struct. THEOCHEM, 464, 211-226 (1999); and the 6-311++G(2 df, 2 pd) basis set. Whereas the B3LYP hybrid functional generally provides an excellent balance of speed and accuracy, the M062X double hybrid functional typically offers superior accuracy for molecules with charge separation. The polarizable continuum model (PCM) was selected to balance calculation speed and accuracy. This choice comes with an inherent loss of accuracy, because implicit solvation models do not account for factors such as solvation sheath structure and preferential solvation in binary solvents. Standard electrode potentials were calculated according to the following reactions for (1) oxidation and (2) reduction of a molecular species, M:

(1)

(2)

The full details of the calculation of electrode half potentials from DFT-calculated free energies of reaction, including the conversion from the absolute to relative electrode potentials, is known in the art.

Results and Discussion

Figure 13:
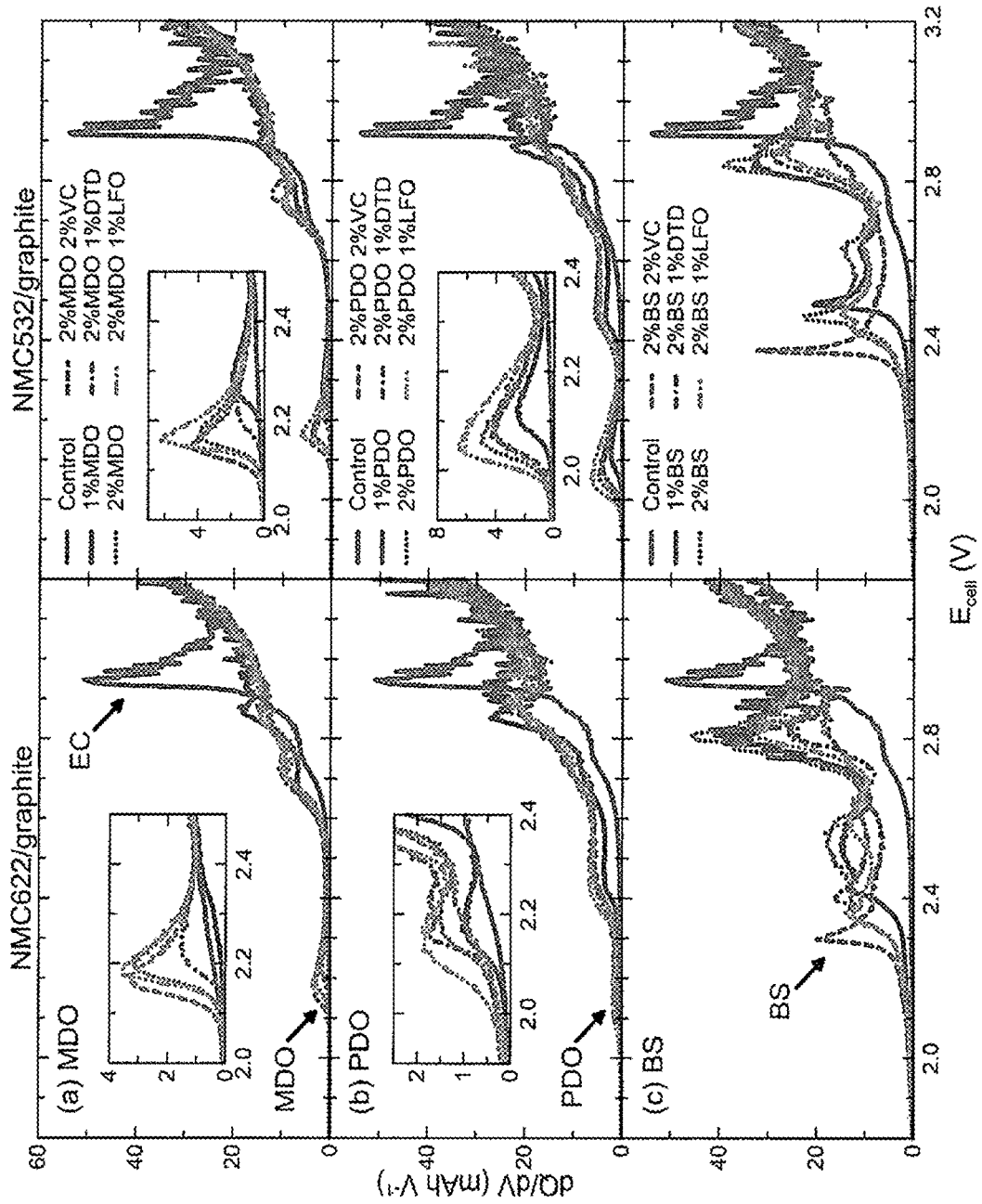
FIG. 13 shows differential capacity (dQ/dV) plots of cell formation in NMC622B/graphite (left) and NMC532/graphite (right) cells. Electrolyte solutions contained (a) MDO-, (b) PDO-, or (c) BS-based additive blends. A 'control' cell was prepared without any additives for comparison.

During the initial portion of the first charging step, the potential of the positive electrode increases very slowly, whereas the potential at the negative electrode surface decreases relatively quickly. As a result, it is during this 'formation' step that the negative electrode SEI is produced, primarily by the electrochemical reduction of EC and/or electrolyte additives at the graphite surface. The differential capacity versus voltage (dQ/dV vs. V) plots of the first charging step, shown in FIG. 13, may therefore be used to consider whether the additives in this work directly produce negative SEI layers. The introduction of MDO into a cell leads to a broad reduction feature that onsets at ~2.1 $V_{cell}$ for both cell types (FIG. 13). Given the positive electrode potentials are initially ~3.5±0.1 V vs Li/Li$^+$, it is therefore estimated that this reduction feature onsets at ~1.4 V vs Li/Li$^+$. It is noted that the reduction feature is quite small and only visible for cells that contained 2% MDO (see inset). An additional reduction feature is observed at ~2.6 $V_{cell}$ (~0.9 V vs Li/Li$^+$) the origin of which is not clear. However, the reduction potential of MDO was calculated using DFT and found to be closer in value to this second feature, $E^0_{red,\,calc}$=0.67 V vs Li/Li$^+$ (Table 2). Finally, there is a small feature at 2.85 $V_{cell}$, attributable to reduction of the EC cosolvents. FIG. 13 includes the formation of a 'control' cell, which was prepared with no additives for comparison. The feature at 2.85 $V_{cell}$ has a larger area for the 1% MDO cell, indicating incomplete graphite passivation, whereas it is quite small in the 2% MDO cells. The results support the previous observation reported by others that MDO passivates graphite electrode surfaces.

Cells prepared with PDO display two clear features in the differential capacity plot (FIG. 13). The first reduction feature onsets at ~2.1 $V_{cell}$ in NMC622/graphite cells (~1.4 V vs. Li/Li$^+$) and ~2.0 V (see inset) in NMC532/graphite cells (~1.5 V vs Li/Li$^+$). The second feature onsets at ~2.35 $V_{cell}$ in both cell types (~1.15 V vs Li/Li$^+$). As with MDO, the latter of these is the closer match with the DFT-calculated reduction potential, 1.18 V vs Li/Li$^+$ (Table 2). The EC reduction feature is again weakly present in PDO-containing cells and its area is greater in 1% PDO than it is in 2% PDO cells. Moreover, the area of the EC feature is very small for all PDO-containing cells compared to additive-free cells. This demonstrates that PDO leads to the formation of a passive, or at least a partially passive, SEI on the graphite electrode.

Finally, cells prepared with BS also display two prominent features in the differential capacity plot (FIG. 13). The area of these features, which is directly proportional to the charge associated with the corresponding reduction, is significantly greater than observed for MDO and PDO reduction. There is also more variability in the onset potential of these features, which range from 2.2-2.4 $V_{cell}$ (~1.1-1.3 V vs Li/Li$^+$) and 2.4-2.6 $V_{cell}$ (~0.9-1.1 V vs Li/Li$^+$) between the two cell types and various additive blends. For BS, both features are comparable to the DFT-calculated reduction potential, 1.16 V vs Li/Li$^+$ (Table 2). The area of the EC reduction feature is not significantly decreased for cells prepared with BS as a standalone additive. The differential capacity results therefore indicate that BS reduction indeed occurs but that it does not produce a passivating SEI at the graphite surface.

TABLE 2

|  | $E^0_{red,\,calc}$ V vs Li/Li$^+$ | $E^0_{red,\,exp}$ V vs Li/Li$^+$ [a] | $E^0_{ox,\,calc}$ V vs Li/Li$^+$ |
|---|---|---|---|
| MDO | 0.67 | 0.9 | 6.70 |
|  |  | 1.4 |  |
| PDO | 1.18 | 1.15 | 5.97 |
|  |  | 1.4-1.5 |  |
| BS | 1.16 | 0.9-1.1 | 5.73 |
|  |  | 1.1-1.3 |  |

[a] Assuming $E_{NMC,\,initial}$ ~3.5 V vs. Li/Li$^+$

Shown in Table 2 are the standard reduction and oxidation potentials of the three additives. These were calculated with DFT using M06-2X/6-311++g(2df,2pd)/IEF-PCM(ε=20).

The experimental reduction potentials, estimated from FIG. 13, are provided for comparison.

Figure 14:
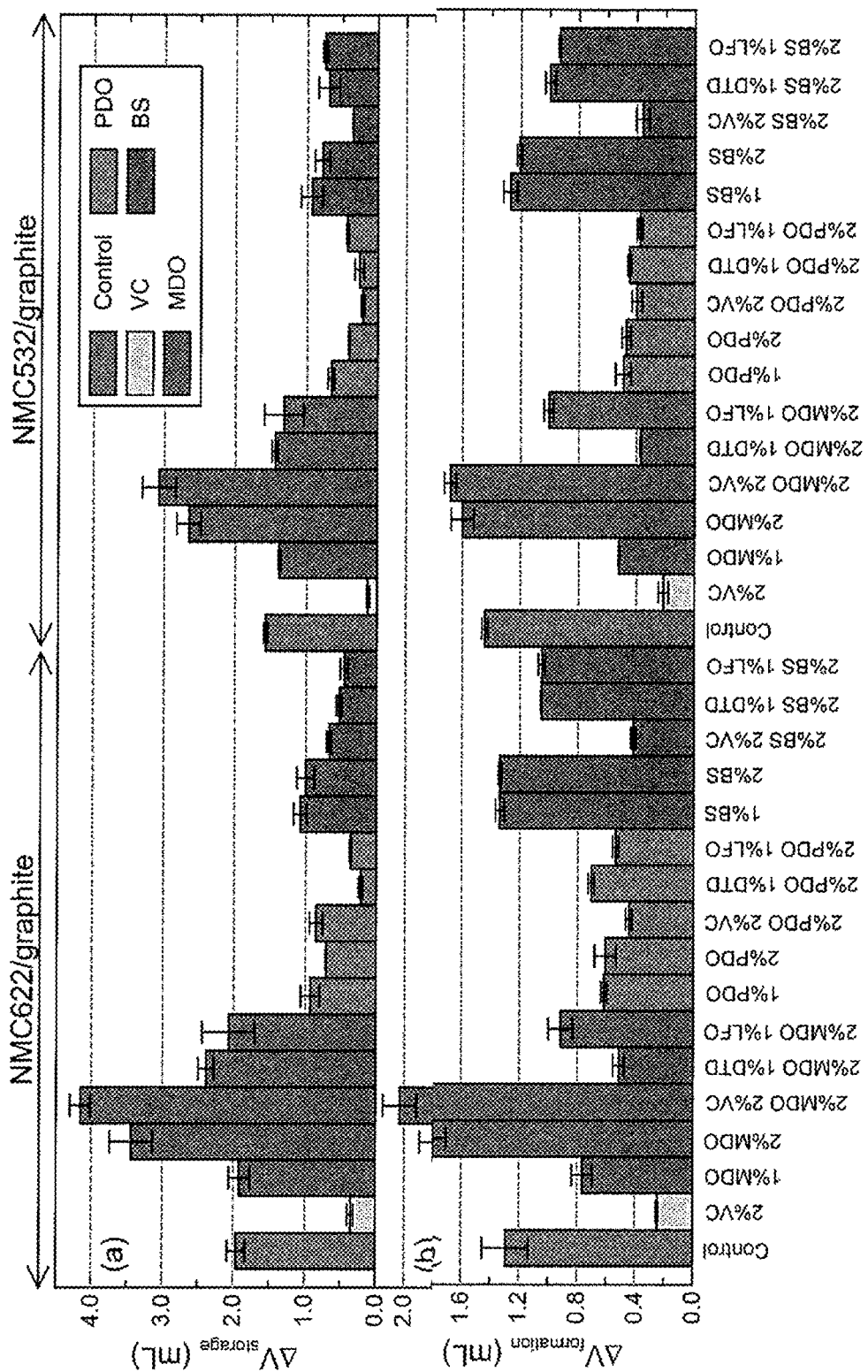
FIG. 14 illustrates cell volume change due to gas production during (a) 4.3 V storage for 500 hr at 60° C. and (b) cell formation to 4.3 V in NMC622B/graphite (left) and NMC532/graphite (right) cells. Electrolyte solutions contained MDO-, PDO-, or BS-based additive blends.

The quantity of gas produced following the full formation cycle to 4.3 V is summarized in FIG. 14. Whereas some gas production during formation is largely inevitable, it is desirable to develop solution chemistries that do not produce gas excessively. It is observed that PDO-containing cells produced the least amount of gas, whereas MDO-containing cells produced the most. It is interesting that the passivation behavior of MDO at the negative electrode, as discussed above, does not limit gas production. Since cells with control electrolyte produce about 1.2 mL of gas during formation due to EC reduction and cells with 2% MDO produce about 2 mL, it is clear that MDO must react with $Li^+ + e^-$ to produce gaseous products. FIG. 14 shows that DTD mitigates gas production from MDO. Prior studies have shown that cells with 1% DTD or pb 2% DTD as sole additives (in NMCp111/graphite cells), yield 0.8 and 1.0 mL of gas during formation. Others have also shown that significant gas is also produced during formation in NMC532/graphite cells that contain just DTD and that this gas is primarily ethylene. Therefore it is believed that there is some synergy in the behavior of MDO and DTD that acts to limit gas production.

Figure 15:
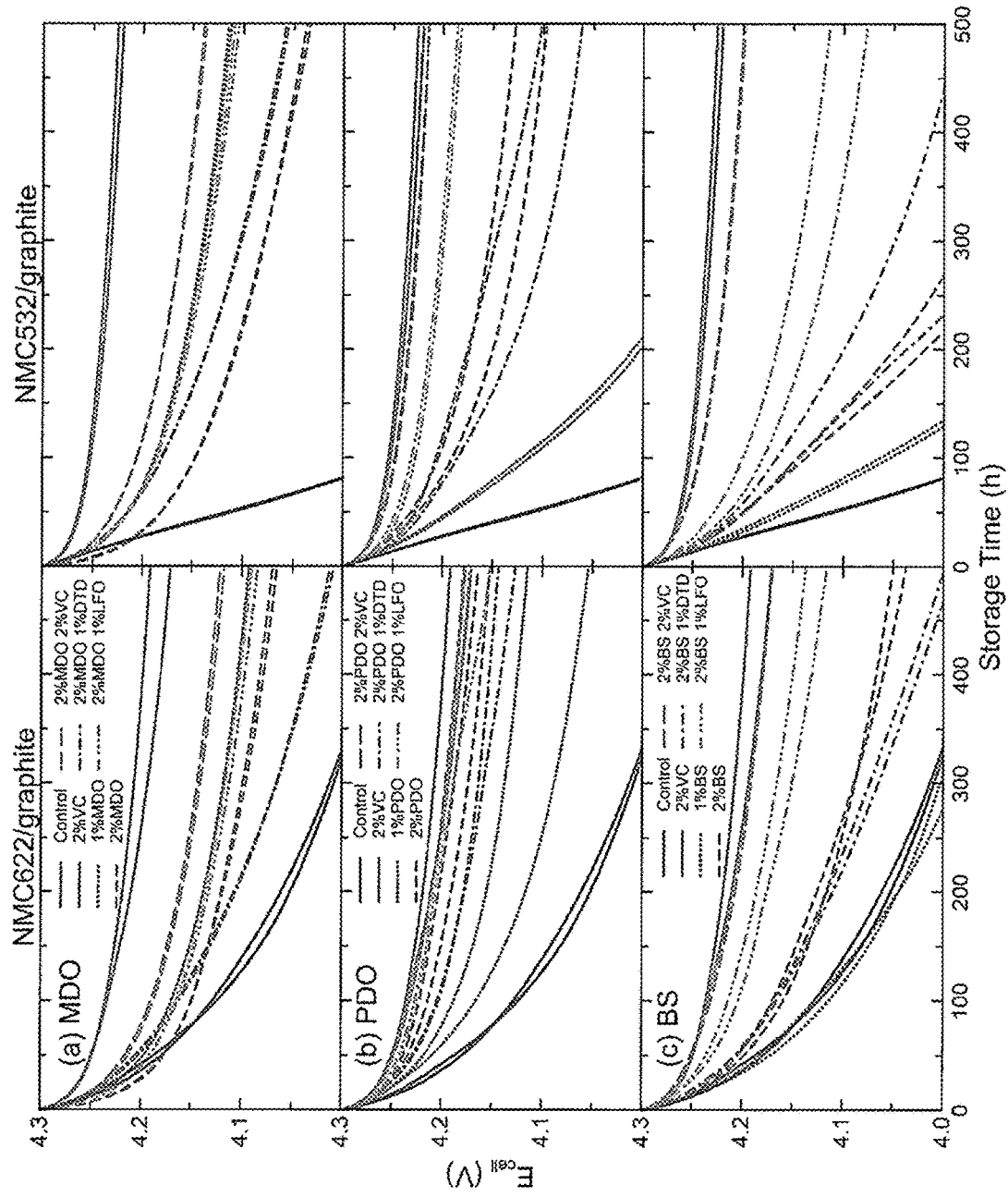
FIG. 15 illustrates cell voltage in NMC622/graphite (left) and NMC532/graphite (right) cells was measured during open circuit storage at 60° C. for 500 hr. Electrolyte solutions contained (a) MDO-, (b) PDO-, or (c) BS-based additive blends, as indicated on the figure.
Figure 16:
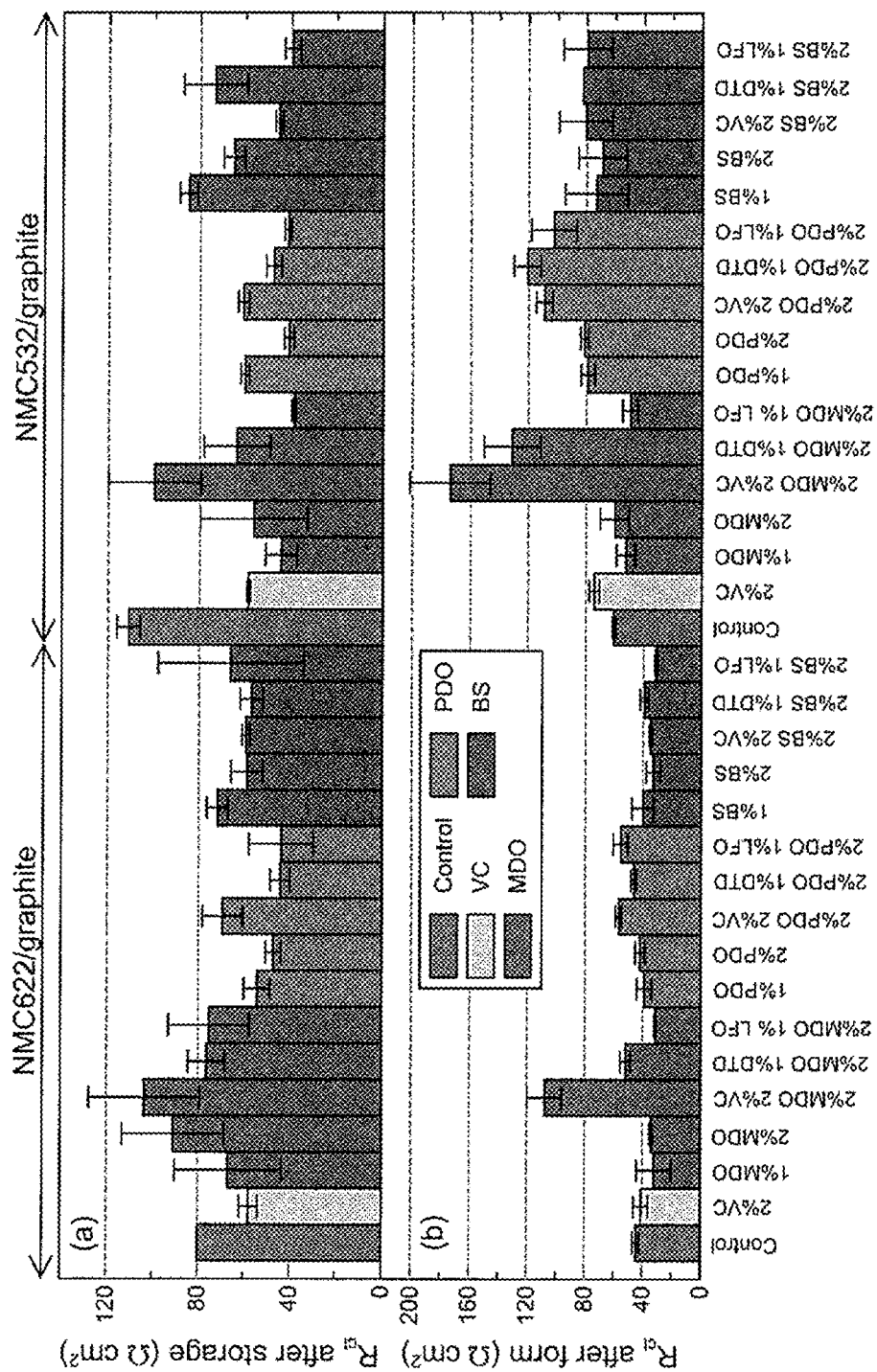
FIG. 16 illustrates $R_{ct}$ after formation (a) storage for 500 hr at 60° C. and (b) cell formation to 4.3 V in NMC622/graphite (left) and NMC532/graphite (right) cells. Electrolyte solutions contained MDO-, PDO-, or BS-based additive blends, as indicated at the bottom of the figure.

Following the formation and degassing protocols, cells were apportioned into two groups and taken for either high-temperature storage or long-term cycling. For the former, the terminal voltage was measured automatically every 6 hr for 500 hr while the cells were maintained at 60° C. (FIG. 15). Some degree of self-discharge under such harsh conditions is inevitable, which provides a practical opportunity to compare the performance of various cell chemistries on a relatively short timescale. FIG. 15 shows that MDO, PDO, and BS all display poor storage behavior when used as standalone additives. For all three additives, the performance was not improved by the introduction of DTD, whereas LFO offered some improvements for PDO and BS. During storage at high voltage and temperature, the production of significant gas volumes is often of concern. FIG. 14 shows that significant gas evolution occurs in cells prepared with MDO, whereas PDO-containing cells produced the least gas in this work. EIS was also measured to observe whether there was significant impedance growth during storage. However, the results summarized in FIG. 16 indicate that impedance growth is not a significant concern for any of the cells tested in this work. Overall, the best storage performance was observed in cells that contained VC as a co-additive and the storage results suggest that PDO is the most promising of the three additives.

Figure 17:
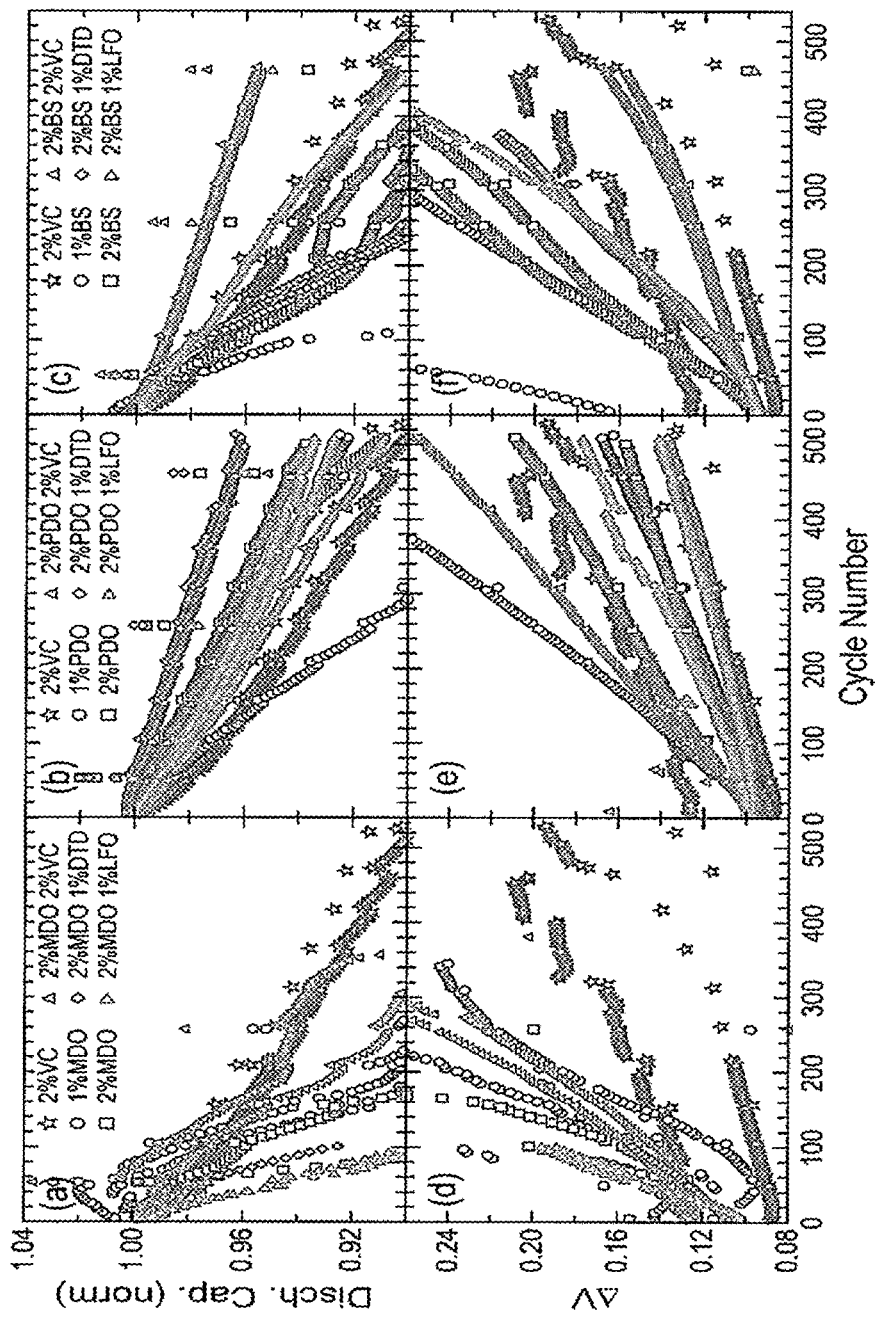
FIG. 17 (a-c) illustrates normalized discharge capacity and (d-f) ΔV of NMC622/graphite pouch cells cycled at 40° C. and C/3 charge-discharge rate to 4.3 V. Electrolyte additive concentrations are as indicated.

The remainder of the cells in this work were tested via long-term cycling at 40° C. and at C/3 charge-discharge rate to 4.3V. In NMC622/graphite cells, MDO-containing cells performed worse than cells made with 2% VC, which is a common additive that offers a good 'standard' comparison (FIG. 17). This is the opposite result than was reported in S. Miser, A. Lerchen, L. Ibing, X. Cao, J. Kasnatscheew, F. Glorius, M. Winter, and R. Wagner, Chem. Mater., 29, 7733-7739 (2017), which found that 2% MDO outperformed either 2% VC or 2% FEC. This difference may be ascribed to the very different electrolyte solutions employed in that work, 1M $LiPF_6$ in PC versus the 1.2M $LiPF_{6\ in}$ 25EC:5EMC:70DMC used in the present study. The capacity retention of NMC622/graphite cells prepared with 2% PDO (including binary blends) is comparable to or better than the 2% VC cells. Of these, 2% PDO+1% DTD is the best-performing blend, which is in contrast to the poor storage behavior of this cell chemistry, relative to 2% VC (FIG. 17). Finally, the cycling performance of BS in NMC622/graphite cells (FIG. 17) is only comparable to the 2% VC cell for the 2% BS+2% VC blend. Of particular issue is the steep slope of AV versus cycle number ($\Delta V$ is the difference between average charge and average discharge voltages) for BS-containing cells (FIG. 17). This is often a negative sign for the longer-term performance of a cell. These results therefore support the previous observation that PDO is the most promising of the three additives developed in this work.

Figure 18:
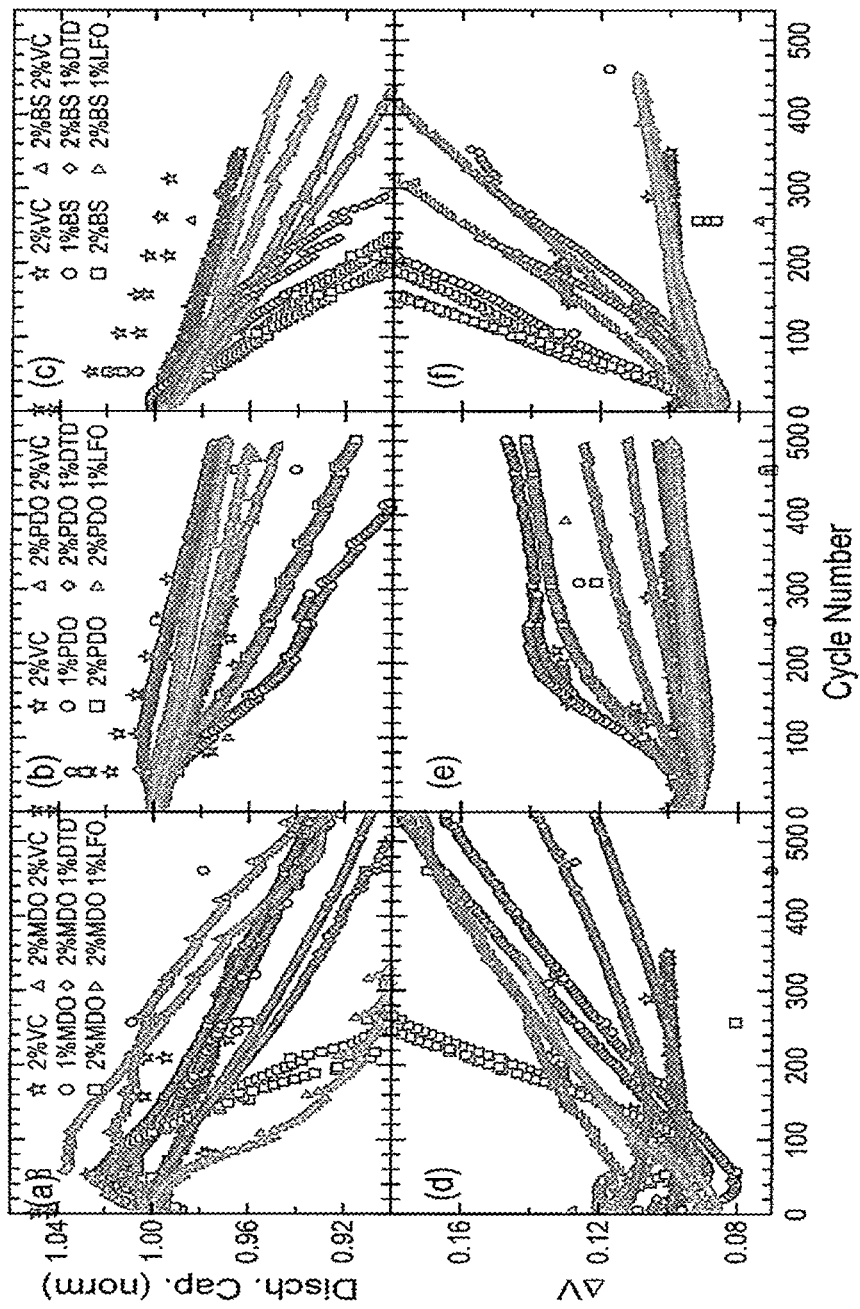
FIG. 18 (a-c) illustrates normalized discharge capacity and (d-f) ΔV of NMC532/graphite pouch cells cycled at 40° C. and C/3 charge-discharge rate to 4.3 V. Electrolyte additive concentrations are as indicated.

MDO-containing cells cycle considerably better in the NMC532/graphite cells, with comparable capacity retention to the 2% VC cells for 1% MDO, 2% MDO+1% DTD, and 2% MDO+2% VC (FIG. 18). However, there is considerable growth in $\Delta V$ versus cycle number for all of the MDO-containing cells. This indicates impedance growth and is often an early indication that a cell will eventually exhibit severe capacity fade and fail. Cells prepared with PDO as a standalone additive exhibit worse cycling performance than the 2% VC cells, in terms of both discharge capacity and $\Delta V$ (FIG. 18). However, the PDO-based blends all outperform 2% VC in terms of capacity retention. 2% PDO+1% DTD and 2% PDO+1% LFO additionally exhibit very little increase in $\Delta V$ versus cycle number, indicating these are both potentially good solution chemistries in NMC532/graphite cells. Finally, all of the BS-containing cells underperform 2% VC in this cell type.

Figure 19:
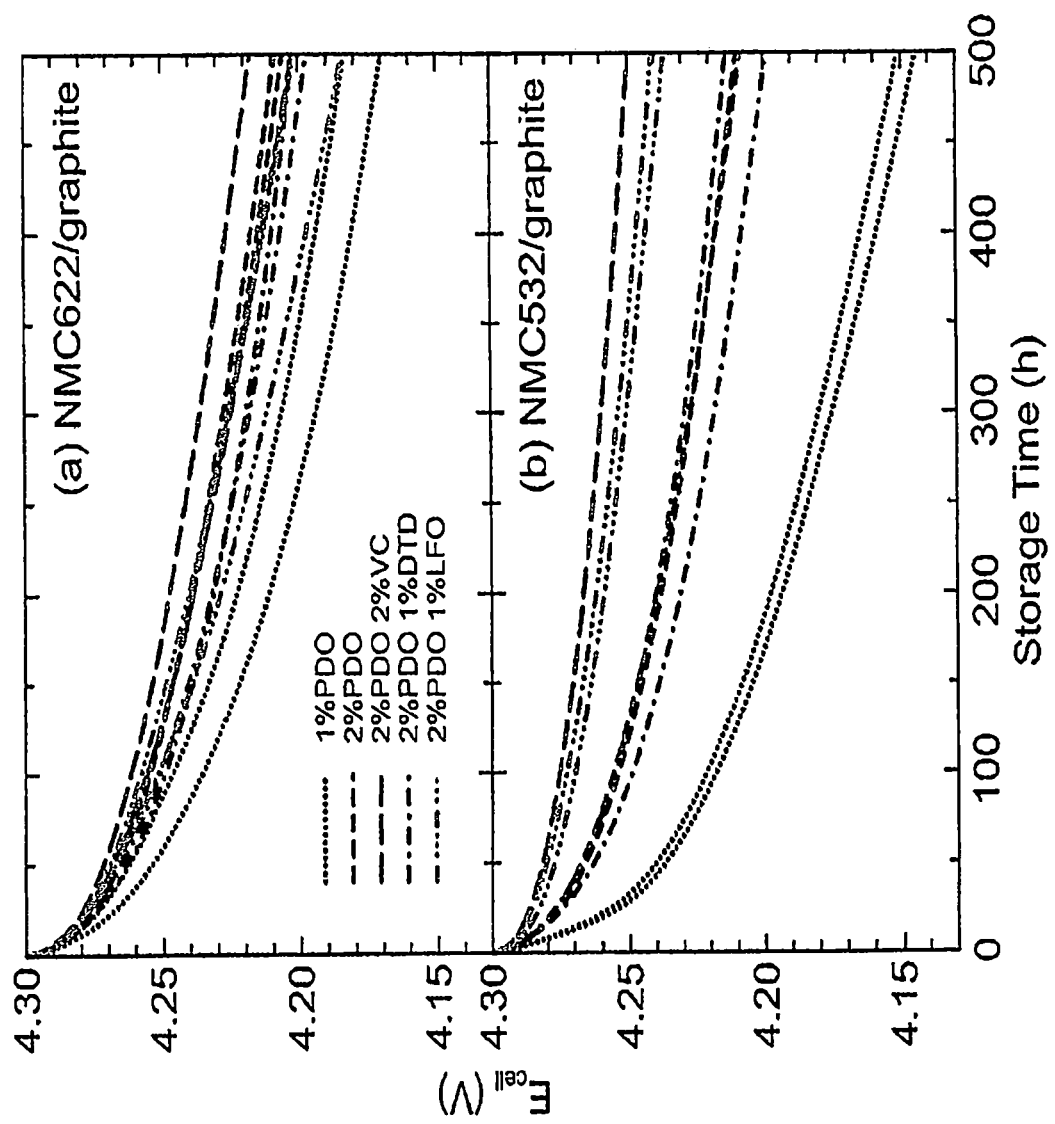
FIG. 19 illustrates that the PDO-containing cells shown in FIG. 15b were charged to 4.3 V and stored at open circuit at 60° C. for an additional 500 hr. The cell voltage in (a) NMC622/graphite and (b) NMC532/graphite cells was measured during open circuit storage at 60° C. for 500 hr. The PDO-based additive blends are as indicated.

Finally, it was considered whether the storage performance of PDO-containing cells improves or deteriorates over multiple charge-store cycles. FIG. 19 shows the open circuit voltage of PDO-containing cells that had already been stored at 60° C. for 500 hr (FIG. 15b) and that were then charged back to the 4.3 V upper voltage limit and stored for an additional 500 hr. The results demonstrate a significantly smaller voltage drop during this second storage period, relative to the first. This finding is significant because it suggests that PDO performs well in storage but requires a sufficient SEI growth and maturation period. The long-term evolution of additive-derived SEI layers is a complex area of study that merits additional investigation to understand how the processes may be modeled for accurate cell lifetime and performance evolution predictions.

The cycling, gas evolution and storage performance therefore indicate that PDO is a promising new electrolyte additive, especially when used in combination with DTD and LFO co-additives.

CONCLUSIONS

This work characterizes the high temperature storage and long-term cycling performance of lithium-ion NMC/graphite pouch cells prepared with a recently developed electrolyte additive, MDO, and two new additives, PDO and BS. Differential capacity versus voltage indicates that both MDO and PDO form passive SEI layers on the graphite electrode surface during cell formation, whereas BS does not. The reduction features are generally consistent with DFT-predicted values, although the presence of multiple reduction peaks requires additional study to rationalize. As individual additives, PDO-containing cells show the best performance although these are nonetheless out-performed by VC-containing cells. The additives were also tested in binary blends with VC, DTD, and LFO. In long-term cycling tests, cells prepared with 2% PDO/1% DTD and 2% PDO/1% LFO additive blends outperform VC-containing cells. However, the high temperature storage behavior of 2% PDO/1% LFO is superior than that of the 2% PDO/1% DTD blend. A person of skill in the art will understand that compositions described herein may be further optimized, for example, by adjusting the ratio of primary and secondary additives or through introducing ternary blends.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%. Similarly, reference to any percentage of an additive is construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A nonaqueous electrolyte for a lithium ion battery comprising at least one lithium salt, at least one nonaqueous solvent, and an additive component comprising at least one operative additive from:
   (a) the group consisting of 3-aryl substituted 1,4,2-dioxazol-5-one compounds according to Formula (I):

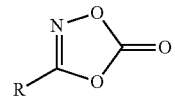

wherein R is any aromatic substituent; or
(c) the group consisting of R-substituted nitrile sulfite compounds according to Formula (III):

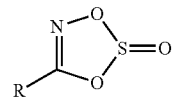

wherein R is any alkyl or aromatic substituent.

2. The nonaqueous electrolyte of claim 1, wherein a concentration of the at least one operative additive is in a range from 0.01 to 6 wt. %, based on the total weight of the electrolyte solution.

3. The nonaqueous electrolyte of claim 1, wherein the concentration of the at least one operative additive is about 2 wt. %, based on the total weight of the electrolyte solution.

4. The nonaqueous electrolyte of claim 1, wherein the additive component includes ethylene sulfate.

5. The nonaqueous electrolyte of claim 1, wherein the additive component includes lithium difluorophosphate.

6. The nonaqueous electrolyte of claim 1, wherein the additive component includes vinylene carbonate, fluoroethylene carbonate, or combinations thereof.

7. The nonaqueous electrolyte of claim 1, wherein the at least one nonaqueous solvent is a carbonate solvent.

8. The nonaqueous electrolyte of claim 7, wherein the at least one nonaqueous solvent is selected from ethylene carbonate and dimethyl carbonate.

9. The nonaqueous electrolyte of claim 7, further comprising a second nonaqueous solvent.

10. The nonaqueous electrolyte of claim 1, wherein the additive component is 3-phenyl-1,4,2-dioxazol-5-one.

11. The nonaqueous electrolyte of claim 1, wherein the additive component is a 3-aryl substituted 1,4,2-dioxazol-5-one compound according to Formula (I):

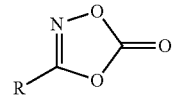

wherein R is any aromatic substituent.

12. A lithium-ion battery comprising:
a negative electrode;
a positive electrode; and a nonaqueous electrolyte comprising a lithium salt dissolved in at least one nonaqueous solvent, and an additive component comprising at least one operative additive from:

(a) the group consisting of 3-aryl substituted 1,4,2-dioxazol-5-one compounds according to Formula (I):

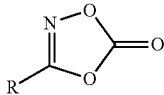

wherein R is any aromatic substituent; or (c) the group consisting of R-substituted nitrile sulfite compounds according to Formula (III):

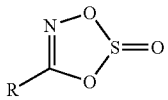

wherein R is any alkyl or aromatic substituent.

13. The lithium-ion battery of claim 12, wherein a concentration of the at least one operative additive is in a range from 0.01 to 6 wt. %, based on the total weight of the electrolyte solution.

14. The lithium-ion battery of claim 12, wherein the concentration of the at least one operative additive is 2 wt. %, based on the total weight of the electrolyte solution.

15. The lithium-ion battery of claim 12, wherein the additive component includes ethylene sulfate.

16. The lithium-ion battery of claim 12, wherein the additive component includes lithium difluorophosphate.

17. The lithium-ion battery of claim 12, wherein the additive component includes vinylene carbonate, fluoroethylene carbonate, or combinations thereof.

18. The lithium-ion battery of claim 12, wherein the nonaqueous solvent is a carbonate solvent.

19. The lithium-ion battery of claim 18, wherein the at least one nonaqueous solvent is selected from ethylene carbonate and dimethyl carbonate.

20. The lithium-ion battery of claim 12, wherein additive component comprises 3-phenyl-1,4,2-dioxazol-5-one.

21. The lithium-ion battery of claim 12, wherein the additive component is a 3-aryl substituted 1,4,2-dioxazol-5-one compound according to Formula (I):

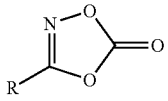

wherein R is any aromatic substituent.

22. The lithium-ion battery of claim 12, further comprising a second nonaqueous solvent.

23. The lithium-ion battery of claim 12, wherein the lithium-ion battery has 95% retention of initial capacity after 200 cycles between 3.0 V and 4.3 V at a charging rate of C/3 CCCV at 40° C.

24. The lithium-ion battery of claim 12, wherein the lithium-ion battery has 95% retention of initial capacity after 400 cycles between 3.0 V and 4.3 V at a charging rate of C/3 CCCV at 40° C.

25. An electric vehicle with a rechargeable battery comprising:
a drive motor;
a gear box;
electronics; and
a battery system comprising a negative electrode, a positive electrode, and a nonaqueous electrolyte, wherein the nonaqueous electrolyte comprises a lithium salt dissolved in at least one nonaqueous solvent, and an additive component comprising at least one operative additive from:

(a) the group consisting of 3-aryl substituted 1,4,2-dioxazol-5-one compounds according to Formula (I):

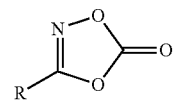

wherein R is any aromatic substituent; or (c) from the group consisting of R-substituted nitrile sulfite compounds according to Formula (III):

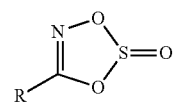

wherein R is any alkyl or aromatic substituent.

26. The electric vehicle of claim 25, wherein a concentration of the at least one operative additive is in a range from 0.01 to 6 wt. %, based on the total weight of the electrolyte solution.

27. The electric vehicle of claim 25, wherein the concentration of the at least one operative additive is 2 wt. %, based on the total weight of the electrolyte solution.

28. The electric vehicle of claim 25, wherein the additive component includes ethylene sulfate.

29. The electric vehicle of claim 25, wherein the additive component includes lithium difluorophosphate.

30. The electric vehicle of claim 25, the additive component includes vinylene carbonate, fluoroethylene carbonate, or combinations thereof.

31. The electric vehicle of claim 25, wherein the nonaqueous solvent is a carbonate solvent.

32. The electric vehicle of claim 25, wherein the at least one nonaqueous solvent is selected from ethylene carbonate and dimethyl carbonate.

33. The electric vehicle of claim 25, wherein additive component comprises 3-phenyl-1,4,2-dioxazol-5-one.

34. The electric vehicle of claim 25, wherein additive component is a 3-aryl substituted 1,4,2-dioxazol-5-one compound according to Formula (I):

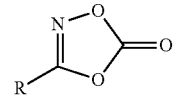

wherein R is any aromatic substituent.

35. The electric vehicle of claim 25, further comprising a second nonaqueous solvent.

36. The electric vehicle of claim 25, wherein the battery system has 95% retention of initial capacity after 200 cycles between 3.0 V and 4.3 V at a charging rate of C/3 CCCV at 40° C.

37. The electric vehicle of claim 25, wherein the battery system has 95% retention of initial capacity after 400 cycles between 3.0 V and 4.3 V at a charging rate of C/3 CCCV at 40° C.

* * * * *

UNITED STATES PATENT AND TRADEMARK OFFICE
CERTIFICATE OF CORRECTION

PATENT NO. : 10,784,530 B2  
APPLICATION NO. : 16/045082  
DATED : September 22, 2020  
INVENTOR(S) : Jeffery Raymond Dahn Page 1 of 2

It is certified that error appears in the above-identified patent and that said Letters Patent is hereby corrected as shown below:

On the Title Page

In Column 2, item (57), Abstract, Line 7, delete "ones" and insert --one--.

In the Specification

In Column 1, Line 53, delete "wt" and insert --wt.--.

In Column 3, Line 44, delete "atoms or" and insert --atoms; or--.

In Column 5, Line 11, delete "di oxazol" and insert --dioxazol--.

In Column 7, Line 26, delete "atomsor" and insert --atoms; or--.

In Column 11, Line 1, delete "Vat" and insert --V at--.

In Column 13, Line 21 (approx.), delete "4fluorobenzoyl" and insert --4-fluorobenzoyl--.

In Column 13, Line 36, delete "(25 mL)," and insert --(25 mL),--.

In Column 13, Line 46, delete "rescrystallised" and insert --recrystallized--.

In Column 14, Line 17, delete "MicoLab" and insert --MicroLab--.

In Column 14, Line 26, delete "$_{(NMC}$" and insert --(NMC--.

In Column 14, Line 26, delete "$_{(NMC}$" and insert --(NMC--.

In Column 17, Line 17, delete "or pb 2%" and insert --or 2 %--.

Signed and Sealed this  
Fifteenth Day of December, 2020

Andrei Iancu  
*Director of the United States Patent and Trademark Office*

CERTIFICATE OF CORRECTION (continued)
U.S. Pat. No. 10,784,530 B2

In Column 17, Line 18, delete "NMCp111" and insert --NMC111--.

In Column 17, Line 56, delete "Miser," and insert --Röser,--.

In the Claims

In Column 22, Line 44 (approx.), Claim 30, delete "the" and insert --wherein the--.